US008788949B2

(12) United States Patent
Hunt et al.

(10) Patent No.: US 8,788,949 B2
(45) Date of Patent: Jul. 22, 2014

(54) PROVISIONING INSTANT COMMUNICATIONS FOR A COMMUNITY OF USERS

(75) Inventors: Martin Hunt, Mountain View, CA (US); Chris Szeto, San Jose, CA (US); James Rodgers, Palo Alto, CA (US); Vijay Raghunathan, San Francisco, CA (US)

(73) Assignee: Google Inc., Mountain View, CA (US)

( * ) Notice: Subject to any disclaimer, the term of this patent is extended or adjusted under 35 U.S.C. 154(b) by 427 days.

(21) Appl. No.: 12/606,946

(22) Filed: Oct. 27, 2009

(65) Prior Publication Data

US 2010/0107088 A1 Apr. 29, 2010

Related U.S. Application Data

(60) Provisional application No. 61/109,117, filed on Oct. 28, 2008.

(51) Int. Cl.
*G06F 3/00* (2006.01)
*G06F 3/048* (2013.01)

(52) U.S. Cl.
USPC .............................. 715/753; 715/759; 709/206

(58) Field of Classification Search
USPC ........... 715/733, 739, 751–759; 709/206–207
See application file for complete search history.

(56) References Cited

U.S. PATENT DOCUMENTS

| 7,035,942 | B2 | 4/2006 | Daniell et al. | |
|---|---|---|---|---|
| 7,124,123 | B1 | 10/2006 | Roskind et al. | |
| 7,165,213 | B1 | 1/2007 | Busey | |
| 7,263,526 | B1 * | 8/2007 | Busey et al. | 1/1 |
| 7,266,583 | B2 * | 9/2007 | Fitzpatrick et al. | 709/205 |
| 7,822,821 | B2 * | 10/2010 | Foote | 709/206 |
| 7,853,881 | B1 | 12/2010 | Assal et al. | |
| 7,941,755 | B2 * | 5/2011 | Siegrist et al. | 715/760 |
| 2002/0087704 | A1 | 7/2002 | Chesnais et al. | |
| 2002/0116458 | A1 | 8/2002 | Bricklin et al. | |
| 2003/0018726 | A1 | 1/2003 | Low et al. | |
| 2003/0105819 | A1 * | 6/2003 | Kim et al. | 709/205 |
| 2003/0126213 | A1 | 7/2003 | Betzler | |
| 2004/0172456 | A1 | 9/2004 | Green | |
| 2005/0065935 | A1 | 3/2005 | Chebolu et al. | |
| 2005/0076103 | A1 * | 4/2005 | Hilf et al. | 709/220 |

(Continued)

FOREIGN PATENT DOCUMENTS

| WO | WO 2008/006115 A2 | 1/2008 |
|---|---|---|
| WO | WO 2008/019350 A2 | 2/2008 |

OTHER PUBLICATIONS

Wolf, "Distributed Virtual Presence Systems for the Web", International Conference on Web Based Communities 2006, pp. 87-99 (IADIS2006), copyright 2006 IADIS.*

(Continued)

*Primary Examiner* — Omar Abdul-Ali
*Assistant Examiner* — Andrew Tank
(74) *Attorney, Agent, or Firm* — Patent Law Works LLP

(57) ABSTRACT

Techniques that enable instant communications services to be provisioned for an online community of users such that the members of the community can interact with each other using instant communications including using instant messaging (IM). In one embodiment, an instant communications facilitator operating from a first domain may provision instant communication services for members of an online community maintained in different domains from the first domain.

21 Claims, 11 Drawing Sheets

(56) References Cited

U.S. PATENT DOCUMENTS

| | | | |
|---|---|---|---|
| 2005/0102358 A1 | 5/2005 | Gold et al. | |
| 2005/0114789 A1* | 5/2005 | Chang et al. | 715/779 |
| 2005/0188076 A1 | 8/2005 | Rayburn et al. | |
| 2005/0262185 A1 | 11/2005 | Beartusk et al. | |
| 2005/0273382 A1 | 12/2005 | Beartusk et al. | |
| 2006/0031234 A1 | 2/2006 | Beartusk et al. | |
| 2006/0045124 A1 | 3/2006 | Dahlstrom et al. | |
| 2006/0221173 A1 | 10/2006 | Duncan | |
| 2007/0271136 A1 | 11/2007 | Strauss et al. | |
| 2007/0282963 A1 | 12/2007 | Mo et al. | |
| 2008/0010344 A1 | 1/2008 | Wherry et al. | |
| 2008/0028323 A1* | 1/2008 | Rosen et al. | 715/752 |
| 2008/0034040 A1 | 2/2008 | Wherry et al. | |
| 2008/0065732 A1* | 3/2008 | Kulkarni et al. | 709/206 |
| 2010/0037153 A1* | 2/2010 | Rogers | 715/758 |
| 2010/0088607 A1* | 4/2010 | Dumpeti et al. | 715/739 |

OTHER PUBLICATIONS

Facebook Developer Wiki, "Facebook Connect—From Facebook Developer Wiki—Welcome to Facebook Connect," page last modified Jan. 29, 2010, printed on Feb. 16, 2010, 7 pages, at URL: http:wiki.developers.facebook.com/index.php/Facebook_Connect.

"Facebook Chat. Everywhere. Chat with your Facebook friends right from your desktop." Copyright 2010, printed on Feb. 16, 2010, 5 pages, at URL: http://www.facebook.com/sitetour/chat.php.

"Jabber Messenger™ for the Web is a zero-footprint instant messaging (IM) client. It provides rapid deployment for standards-based, secure IM and other presence services without having to touch every desktop." Copyright 2007-2008, printed on Feb. 16, 2010, 3 pages, at URL:http://www.jabber.com/CE/JabberMessengerfortheweb.

"JabberMomentIM™—Jabber, Inc.'s AIM® certified, Windows desktop client—has generated a lot of excitement due to its combination of responsiveness, extensibility, and robust enterprise instant messaging (EIM) functionality. This brandable, feature-rich, and programmable EIM client is designed to work with the industry leading *Jabber Extensible Communications Platform™ (Jabber XCP™)*," Copyright 2007-2008, printed on Feb. 16, 2010, 4 pages, at URL: http://www.jabber.com/CE/JabberMomentIM.

Jabber XCP Product Information, printed on Feb. 16, 2010, Copyright 2008, pp. 1-16, at URL: http://www.jabber.com/media/Jabber_XCP.pdf.

Final Office Action for U.S. Appl. No. 11/774,984, mailed on Jun. 14, 2010, 24 pages.

http://www/freejavachat.com, May 20, 2004, 3 pages, archive at: http://web.archive.org/web/20040611120428/www.freejavachat.com/setup.html.

Office Action for German Application No. 11 2007 001 516, dated Apr. 2, 2009, 9 pages. English Translation Included.

International Search Report of the International Searching Authority for Application No. PCT/US07/073081, mailed on Jun. 20, 2008, 4 pages.

Written Opinion of the International Searching Authority for Application No. PCT/US07/073081, mailed on Jun. 20, 2008, 4 pages.

International Preliminary Report on Patentability for Application No. PCT/US07/073081, dated Jan. 22, 2009, 4 pages.

International Search Report of the International Searching Authority for Application No. PCT/US07/075296, mailed on Jul. 7, 2008, 1 page.

Written Opinion of the International Searching Authority for Application No. PCT/US07/075296, mailed on Jul. 7, 2008, 5 pages.

International Preliminary Report on Patentability for Application No. PCT/US07/075296, dated Feb. 10, 2009, 6 pages.

Non-Final Office Action for U.S. Appl. No. 11/774,984, mailed on May 29, 2008, 18 pages.

Final Office Action for U.S. Appl. No. 11/774,984, mailed on Mar. 16, 2009, 20 pages.

Non-Final Office Action for U.S. Appl. No. 11/774,984, mailed on Sep. 16, 2009, 21 pages.

Non-Final Office Action for U.S. Appl. No. 11/834,562, mailed on May 30, 2008, 12 pages.

Final Office Action for U.S. Appl. No. 11/834,562, mailed on Mar. 12, 2009, 13 pages.

Advisory Action for U.S. Appl. No. 11/774,984, mailed on Sep. 7, 2010, 3 pages.

Non-Final Office Action for U.S. Appl. No. 11/774,984, mailed on Jan. 31, 2012, 23 pages.

\* cited by examiner

PROVISIONING INSTANT COMMUNICATIONS FOR A COMMUNITY OF USERS

CROSS-REFERENCES TO RELATED APPLICATIONS

The present application is a non-provisional of and claims the benefit and priority under 35 U.S.C. 119(e) of U.S. Provisional Application No. 61/109,117 filed Oct. 28, 2008, entitled SYSTEM AND METHOD FOR COMMUNITY INSTANT MESSAGING, the entire contents of which are incorporated herein by reference for all purposes.

BACKGROUND

Embodiments of the present invention relate to enabling instant communications, and more particularly to techniques for provisioning instant communication capabilities for a community of users.

The number of online sites that support communities of users has grown exponentially in recent years. A very popular example is Facebook (www.facebook.com) that supports a very large online community of users interested in social networking. A user can become a member of an online community usually by registering with a website supporting that community. Once registered, the website provides services that enable the user to interact with other members of the community. In a typical scenario, a user identifies a subset of the members of the community as the user's friends or buddies and interacts with the identified friends or buddies.

Due to the increasing popularity of online communities, providers of online communities are constantly looking for and offering new and better ways in which members of the community can interact with each other. In such an environment, it is desirable that members of a community be able to interact with each other using instant communications including instant messaging (IM). However, many online communities lack the infrastructure to provide instant communications between its members.

BRIEF SUMMARY

Embodiments of the present invention enable instant communications services to be provisioned for an online community of users such that users of the community can interact with each other using instant communications including using instant messaging (IM). In one embodiment, an instant communications facilitator operating from a first domain may provision instant communication services for members of an online community maintained in different domains from the first domain.

According to an embodiment of the present invention, instant communication services may be provisioned for an online community that enable a member of the online community to exchange one or more messages with another member of the online community using an instant communication technology, such as using instant messaging (IM). The system provisioning the instant communication may be operating from a domain that is different from the domain under which the online community is maintained.

In one embodiment, state information may be stored for a user's instant communication session. The state information is then used to preserve the user's instant communication session across multiple page views. For example, a first user interface may be displayed on a first web page accessed by a first member of an online community from a website of the online community. The first user interface may enable the first member to exchange messages with another member of the online community. In one embodiment, when the first member accesses a second web page (i.e., a different pageview) from the website of the online community provider, the same first user interface is displayed. This is done based upon the state information stored for the user.

Various different pieces of information may be displayed in an instant communication user interface displayed for a user. The displayed information may include presence information for the user or friends of the user, status information for the user or friends of the user, one or more notifications received by the user, and other like information.

In one embodiment, a set of application programming interfaces (APIs) is provided for facilitating exchange of information between a community provider system and a system facilitating the instant communications. For example, a first set of APIs may be provided by the community provider system that is callable by the system facilitating the instant communications. A second set of APIs may be provided by the system facilitating the instant communications that are callable by the community provider system.

In one embodiment, the same system may facilitate instant communications for multiple online communities, such as for a first online community operating from a first domain and a second online community operating from a second domain different from the first domain. The system facilitating the instant communications may be operating from a third domain that is different from the first and second domains. In one embodiment, for a user who is a member of the first online community and the second online community, the user may have a first list of friends for the first online community and a second list of friends for the second online community. In such a scenario, an aggregated list of friends may be displayed on a first web page accessed by the user from a website of the first online community. The aggregated list of friends may include one or more friends in the first list of friends and one or more friends in the second list of friends.

The foregoing, together with other features and embodiments will become more apparent upon referring to the following specification, claims, and accompanying drawings.

DETAILED DESCRIPTION

In the following description, for the purposes of explanation, specific details are set forth in order to provide a thorough understanding of embodiments of the invention. However, it will be apparent that the invention may be practiced without these specific details.

Embodiments of the present invention provision instant communication services for members of an online community. As a result of the provisioning, the members of the online community are able to send messages to one another using instant communication technologies. Instant communication technologies include technologies that enable the real-time delivery of messages between at least one sender and one receiver and may involve maintaining a connection to a service to receive the messages. Examples of instant communication technologies include instant messaging (IM), presence and status messages, multi-user chat, multi-media communication such as voice or video chat, the instant delivery of alerts, notifications, live feeds and other application messages used to create other instant communication applications.

Figure 1:
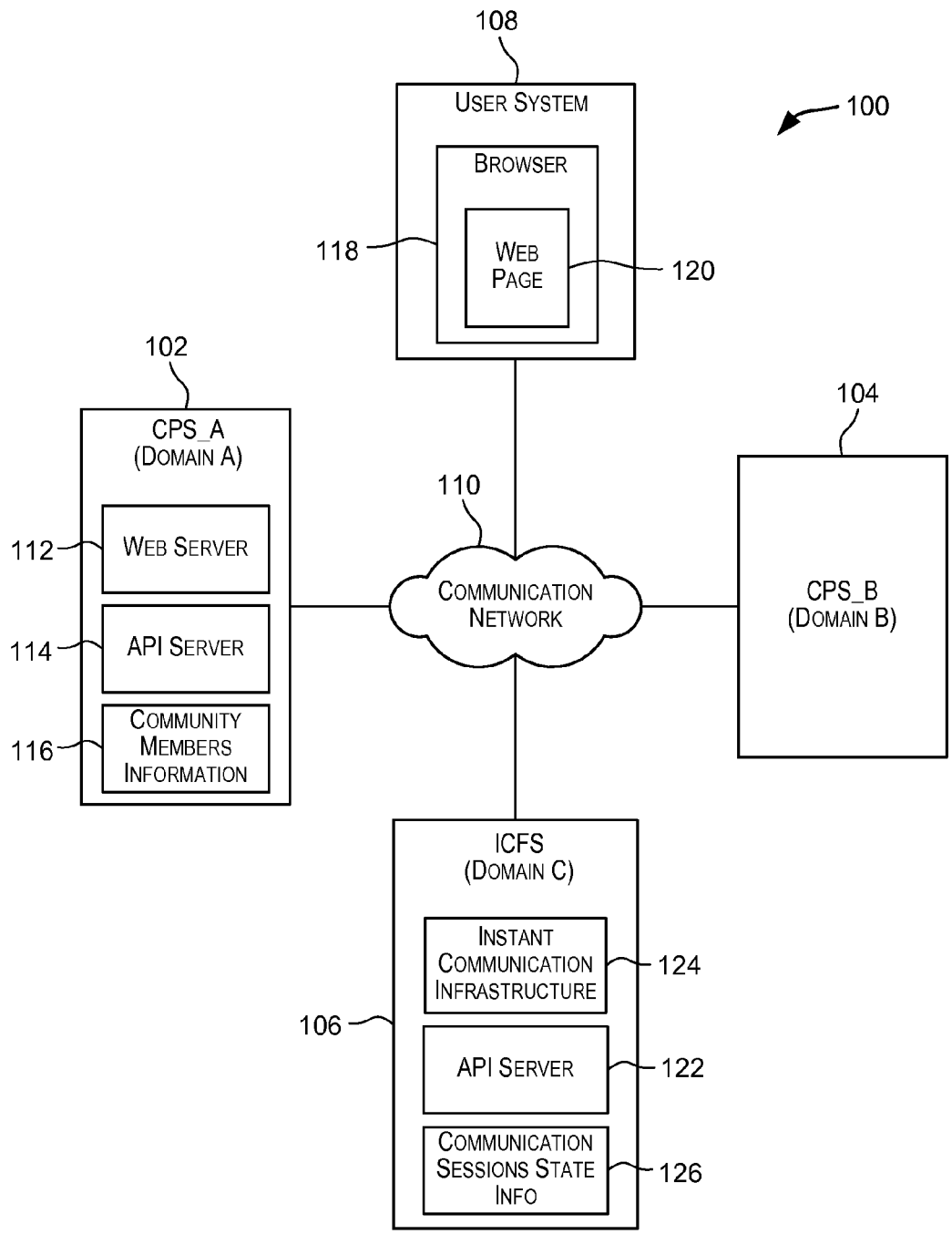
FIG. 1 is a simplified block diagram of system that may incorporate an embodiment of the present invention.

FIG. 1 is a simplified block diagram of system 100 that may incorporate an embodiment of the present invention. It should be noted that FIG. 1 is merely an example of a system that may incorporate teachings of the present invention and is not intended to unduly limit the scope of the claims. One of ordinary skill in the art would recognize many variations, alternatives, and modifications.

As depicted in FIG. 1, system 100 comprises one or more community provider systems (CPSs) (sometimes referred to as "partners") 102 and 104, an instant communication facilitator/provider system (ICFS) 106, and a user system 108 communicatively coupled with each other via communication network 110. Each community provider system may support, maintain, and provide services for a community of users. Examples of community providers include Facebook (social networking community), Flixster (community for information related to movies), Twitter (community of users involved in micro-blogging), MyYearBook (social networking community aimed at high school students), MySpace (social networking community), AIM, GoogleTalk, and several others. For example, in FIG. 1, community provider system (CPS_A) 102 may maintain and provide services for a community A of users. Community provider system (CPS_B) 104 may maintain and provide services for another community B of users. Each community provider system may operate from its own website or domain. For example, in FIG. 1, CPS_A is shown as operating from a domain A (e.g., www.domainA.com) and CPS_B is shown as operating from a domain B (e.g., www.domainB.com) that is different from domain A.

In the embodiment depicted in FIG. 1, CPS_A 102 operating from domain A includes a web server 112 and a Web Services API (application programmer interface) server 114. Web server 112 may be configured to host a website related to the hosted community and serve web pages from the website in response to web page requests. Although only one web server is shown in FIG. 1, there may be several web servers in alternative embodiments.

API server 114 may be configured to interact and exchange information with a number of entities using a set of application programmer interfaces (APIs). In one embodiment, API server 114 is configured to interact with ICFS 106 using a set of Web Service APIs to provide instant communication services for users of community A, as described below in further detail. CPS_A 102 may also store and manage information 116 related to members of community A.

It should be noted that the components of CPS_A depicted in FIG. 1 and described above merely provide an example of a community provider system and is not intended to unduly limit the scope of the claims. One of ordinary skill in the art would recognize many variations, alternatives, and modifications. Further, the system of one community provider may be different from the system of another community provider.

A user may connect to start a session with a website of a community provider system. During the session, the user may access one or more web pages served from the website of the community provider system. For example, a user may use an application such as browser 118 executing on user system 108 to log onto and open a session with a website of a community provider system (e.g., CPS_A 102 and/or CPS_B 104) and access one or more web pages served by that website. Examples of commonly used browsers include Windows Internet Explorer, Mozilla Firefox, Apple Safari, Google Chrome, Opera, and others. A user may request a web page by providing a uniform resource locator (URL) corresponding to the web page to the browser or by clicking on a link in a web page. The requested web page 120 corresponding to the URL or the clicked link is then fetched and output or rendered to the user by the browser.

For example, a user using browser 118 executing on user system 108 may access web pages served by web server 112 of CPS_A 102. The user may use these web pages to become a member of community A maintained by CPS_A 102. Information regarding users that are members of community A may be stored by CPS_A 102 in community members information 116. After becoming a member of community A, the user may identify a subset of members of community A as the user's friends or buddies. The user may then interact with the user's friends. A list of friends of the user is commonly referred to as the user's friend list (or buddy list). Information related to a user's friend list may be stored and maintained by CPS_A 102 as part of community members information 116. The user may add friends or delete previously identified friends as desired.

A user may be a member of multiple online communities. For example, a user may be a member of community A maintained by CPS_A 102 and a member of community B maintained by CPS_B 104. The user may have a friend list specific to each online community. Accordingly, the user may have one friend list for community A and another friend list for community B. In this manner, a user may be a member of several online communities with a friend list specific to each community identifying a subset of members of that community.

According to an embodiment of the present invention, ICFS 106 is configured to provision instant communication services for users (members) of one or more online communities. For example, for the embodiment depicted in FIG. 1, ICFS 106 may provide instant communication capabilities to user members of community A supported by CPS_A 102. ICFS 106 may also provide instant communication capabilities to user members of community B supported by CPS_B 104. In this manner, ICFS 106 may provide and enable instant communications for users of multiple online communities. Since the instant communication capabilities are provided by ICFS 106, a community provider (e.g., CPS_A 102 for community A) does not have to itself invest in or host an infrastructure for providing instant communication capabilities for its members. The instant communication services are outsourced from ICFS 106.

ICFS 106 may operate under its own domain (e.g., www.icfs.com) that is different from the domains of the community provider systems for whom the instant communication capabilities are provided. For example, as depicted in FIG. 1, ICFS 106 operates from domain C that is different from domain A of CPS_A 102 and domain B of CPS_B 104. In this manner, instant communication services are provisioned by a first domain for a community of users maintained by a second domain that is different from the first domain. In one embodiment, ICFS 106 is provided by Meebo, Inc. of Mountain View, Calif. and operates under the domain meebo.com. From a user's perspective, the fact that the instant communication services are being hosted by a third-party facilitator rather than the community provider system is transparent to the user, meaning that a user cannot detect any difference between a community provider system-hosted instant communication solution and an instant communication solution hosted by ICFS 106.

Since the system facilitating instant communication services and the system maintaining the community of users for which the services are provisioned operate under different domains, special techniques are used for communication of information between ICFS 106 and a community provider system. The normal practice for making cross-domain XHR (XmlHttpRequest) requests is a practice called 'jsonp' (json with padding). A scripting language such as JavaScript running in the context of domain A in the user's browser 118 makes a script tag request to a URL on domain B with the data for the request and the name of a function referred to as the callback function. The server response contains a JavaScript expression that calls the callback function with the response data as the argument to the callback function. Since the call was initiated using a script tag, the browser evaluates the response, executing the callback function with the response data. As an example, if the browser makes a request to the server with the callback function 'processCommand', and if the server wants to return the string literal 'Hello', the jsonp response would be processCommand('Hello');

The browser then evaluates the response, calling processCommand with 'Hello' as the first argument. This method, however, does not work for POST requests. The common method for cross-domain POST requests is to submit the POST using a form with an IFRAME target. Since the IFRAME loads the response data in a cross-domain container, the JavaScript making the request cannot access the response data. In one embodiment, this problem is overcome by creating a long-polling cross-domain GET request to a backend session (referred to as the eventsloop) of ICFS 106 and using that as a channel upon which responses can be returned. A long-polling request is a request that does not return a response until data is available or a minimum amount of time has elapsed, whichever comes first. When the JavaScript wishes to make a cross-domain XHR POST request, it adds a requestid parameter to the request. This is a signal to ICFS that the response should be sent over the eventsloop along with the given requestid (to give the JavaScript the correct context). Accordingly, JavaScript running in the context of domain A makes a long-polling eventsloop GET request A1 to domain B. It then sends a POST request A2 to domain B (e.g., to instant communication infrastructure server 124 of ICFS 106). The response to the GET request A1 from domain B contains the response to request A2.

In one embodiment, the cross-domain communication problem can be avoided by having the community provider system create a DNS record as a subdomain of their main domain pointing to ICFS servers. This avoids the cross-domain rules since the requests are from "CPS.com" to "ICFS.CPS.com". This however substantially increases the complexity of the deployment for the community provider system. This solution is also not very scalable. It should be noted that the jsonp and requestid implementations are not necessary with recent browser technology. Current browsers support cross-origin messaging through a postMessage method which allows frames on separate domains to communicate securely within the browser. Using postMessage, local XHRs in a frame on the ICFS domain can be used and the results are posted back to the parent frame on a separate domain. Many browsers also support cross-domain XHRs directly. A large population of users however continues to use older browsers that do not have support for these technologies. In one embodiment, the technique used for cross-domain communications is selected based on what the browser supports. For newer browsers, the new methods may be used, while for old browsers the jsonp method described above may be used.

In one embodiment, a set of Web Service APIs (application programming interfaces) are provided that enable a community provider system and ICFS 106 to communicate and exchange information with each other to enable the instant communication services. The Web Service APIs comprise a set of Web Service APIs provided by the community provider system (referred to as CPS_APIs) and a set of Web Service APIs provided by ICFS 106 (referred to as ICFS_APIs). The CPS_APIs comprise APIs that ICFS 106 may call to get information from or post information to a community provider system. CPS_APIs may also include APIs that ICFS 106 may call to cause the community provider system to perform an operation. The ICFS_APIs comprise APIs that a community provider system may invoke to get information from or post information to ICFS 106. ICFS_APIs may also include APIs that a community provider system may call to cause ICFS 106 to perform a task or operation.

Processing related to handling of APIs is performed by API servers present in the community provider system and in ICFS 106. As previously described, CPS_A 102 comprises an API server 114. As depicted in FIG. 1, ICFS 106 comprises an API server 122. API server 122 may be configured to interact and exchange information with one or more entities using one or more sets of APIs. In one embodiment, API server 122 is configured to interact and exchange information with a community provider system using a set of Web Service APIs.

In one embodiment, API server 122 is configured to communicate with one or more servers of a community provider system including with API servers (e.g., API server 114 of CPS_A 102) of the community provider system. In one embodiment, API server 122 is configured to call CPS_APIs provided by a community provider system and process responses received in response to the API calls. Requests to server 114 of a community provider system may also be made by instant communication infrastructure 124. For example, API server 122 may invoke a CPS_API provided by CPS_A 102. The call is communicated to API server 114 of CPS_A 102. API server 114 may then perform processing corresponding to the API call, generate a response, and communicate the response to API server 122 of ICFS 106. The response may be communicated in different ways. According to one way, the response is communicated as a direct response to the request, which is returned directly to the requesting server. According to another way, the response is communicated as a separate request to the other partner's API servers. ICFS 106 may then perform further processing based upon the response received from the community provider system. API server 122 is also configured to receive CPS_API calls invoked by other community provider systems, perform processing corresponding to the CPS_API calls, generate responses for the calls, and communicate the responses to the API server of the calling community provider system. For example, API server 122 may receive an ICFS_API call from API server 114 of CPS_A 102. API server 122 may then perform processing corresponding to the call, generate a response, and communicate the response to API server 114 of CPS_A 102.

The API servers on the community provider systems and ICFS 106 function as receiving points. Requests can be made to them by any of the other party's servers.

As depicted in FIG. 1, ICFS 106 may also comprise an instant communication infrastructure 124 that implements instant communication sessions for a community of users. For example, instant communication infrastructure 124 may support IM chat sessions between members of a community. Instant communication infrastructure 124 may comprise one or more IM gateways and one or more chat servers (e.g., Jabber servers) that facilitate the chat sessions.

In the embodiment depicted in FIG. 1, instant communication infrastructure 124 is hosted by ICFS 106. However, instant communication infrastructure 124 needed not be hosted by ICFS 106. In alternative embodiments, the instant communication infrastructure may be hosted by third-party servers or even servers of a community provider system. In such an embodiment, ICFS 106 may provide an IM gateway that is configured to communicate with IM servers that may be hosted by a third party. For example, a community provider system may provide the instant communication infrastructure. In such an embodiment, the instant communication infrastructure of the community provider system may be used for supporting instant communication among members of the community provider (instead of using ICFS' instant communication infrastructure). In such an embodiment, ICFS 106 may connect to the community provider system and use them as the conduit for delivering IMs. A user member of the community provided by the community provider system may be authenticated by ICFS 106 (e.g., using a username and password as described below) and a friend list may be retrieved for the user, but in order to send a message, ICFS 106 sends it to the community provider system's IM network servers.

As described above, ICFS 106 enables instant communication sessions between user members of a community. In one embodiment, ICFS 106 is configured to store session state information 126 associated with instant communication sessions between members of a community. In one embodiment, ICFS 106 is configured to store instant communication session state information for each community member participating in an instant communication session. The instant communication session status information stored for a member of a community may comprise information such as: (a) status information for the member (e.g., available, busy, etc.), which describes the manner in which a user is online (This can include, for example, status messages where a user can say something like "Thank goodness it is Friday"); (b) presence information for the member including information indicating whether the member is online or offline; (c) information related to messages sent by or received by the member; (d) information related to notifications received by the member; (e) a session ID for the user; (f) information related to the user's friends including status of the friends; (g) the user's profile information such as information about the user, the user's name, a photo/icon to be displayed for the user, etc.; and (h) other information related to the member user's session. As described below in further detail, the session state information stored by ICFS 106 is used by ICFS 106 to preserve the state of a user's instant communication session across multiple page-views served to the user from the website of a community provider system.

The various systems depicted in FIG. 1 may communicate with each other via communication network 110. Communication network 110 may be any network that enables communications between the various systems. Examples of communication network 110 include an Intranet, a local area network (LAN), a wide area network (WAN), an Ethernet network, and the like, or combinations thereof. Different communication protocols, including wired and wireless protocols, may be used for data communications over network 102 including but not limited to TCP/IP, SNA, IPX, AppleTalk, IEEE 802.XX suite of protocols, the Bluetooth protocol, and/or other protocols or combination of protocols.

At a high level, enabling instant communication for a community of users involves design time actions that are taken by the online community provider and runtime processing that is performed when a user member of the community logs into the community provider's website and accesses web pages served from the website. In one embodiment, as part of the design time actions, the online community provider associates special code or instructions with each web page served from the community provider's website. This special code is executed at runtime when the web page is loaded by a browser executing on a user system and enables instant communication services for the user that enable the user to exchange messages with other members of the online community.

In one embodiment, the code that is associated with web pages served by an online community provider system comprises a piece of JavaScript that is added to pages served from the website of the community provider system. An HTML file that is used by the JavaScript code is also placed in a location accessible to the JavaScript code. The HTML file may be placed on a web server of the community provider system or alternatively may be placed on ICFS 106.

In one embodiment, the following JavaScript code is associated with web pages. The code may be placed immediately after the <body> tag of the web page. This is done so that the JavaScript has ample time to load while the web page loads simultaneously.

```
<body>
<script> var ICFS =
{exec:function( ) {ICFS.__.push(arguments)},__:[ ]};</script>
<div id="ICFS" style="display.none"><iframe id="ICFS-iframe"
src="/ICFS.html?network=NETWORKNAME"></iframe></div>
```

As can be seen from the JavaScript, the code writes an IFRAME and sets up communication with the IFRAME. The IFRAME is used to asynchronously load the JavaScript code in the HTML file. By loading the code asynchronously, the impact of loading the code on the web page loading is minimized. Using an IFRAME ensures that if the ICFS servers are slow or break, the web page served from the community provider's website continues to load and function like normal. Using an IFRAME also helps to avoid name collisions between the JavaScript code and the code on the web page. Once the JavaScript code has loaded on a web page served from a website of a community provider system, it creates a user interface (the user interface that enable instant communication, e.g., instant communication user interface 407 depicted in FIG. 4 and described below) also defines a set of APIs (JavaScript APIs) for the webpage to interface with, creating new functionality that is better integrated with the user experience. These APIs may be used for communicating with ICFS 106. For example, the web page may display a list of members of the community that when clicked on will call a JavaScript API to create an IM window to start talking to that user. This enables a user to interact with the chat system by interacting with the web page. The web page can essentially call JavaScript API's to start a conversation; share content such as photos, videos, text, and links; configure the user interface by enabling or disabling features; and so on. The JavaScript APIs allow JavaScript code on the webpage from a community provider system (e.g., CPS_A) running in the browser to interact with JavaScript code from ICFS 106 running in the same browser. The APIs allow the community provider web page to perform actions such as opening an IM window or sharing content when a user clicks on parts of the partner page. While the embodiment described above uses JavaScript, in alternative embodiments, the code associated with a web page may be in any other language, including any scripting language.

Figure 2:
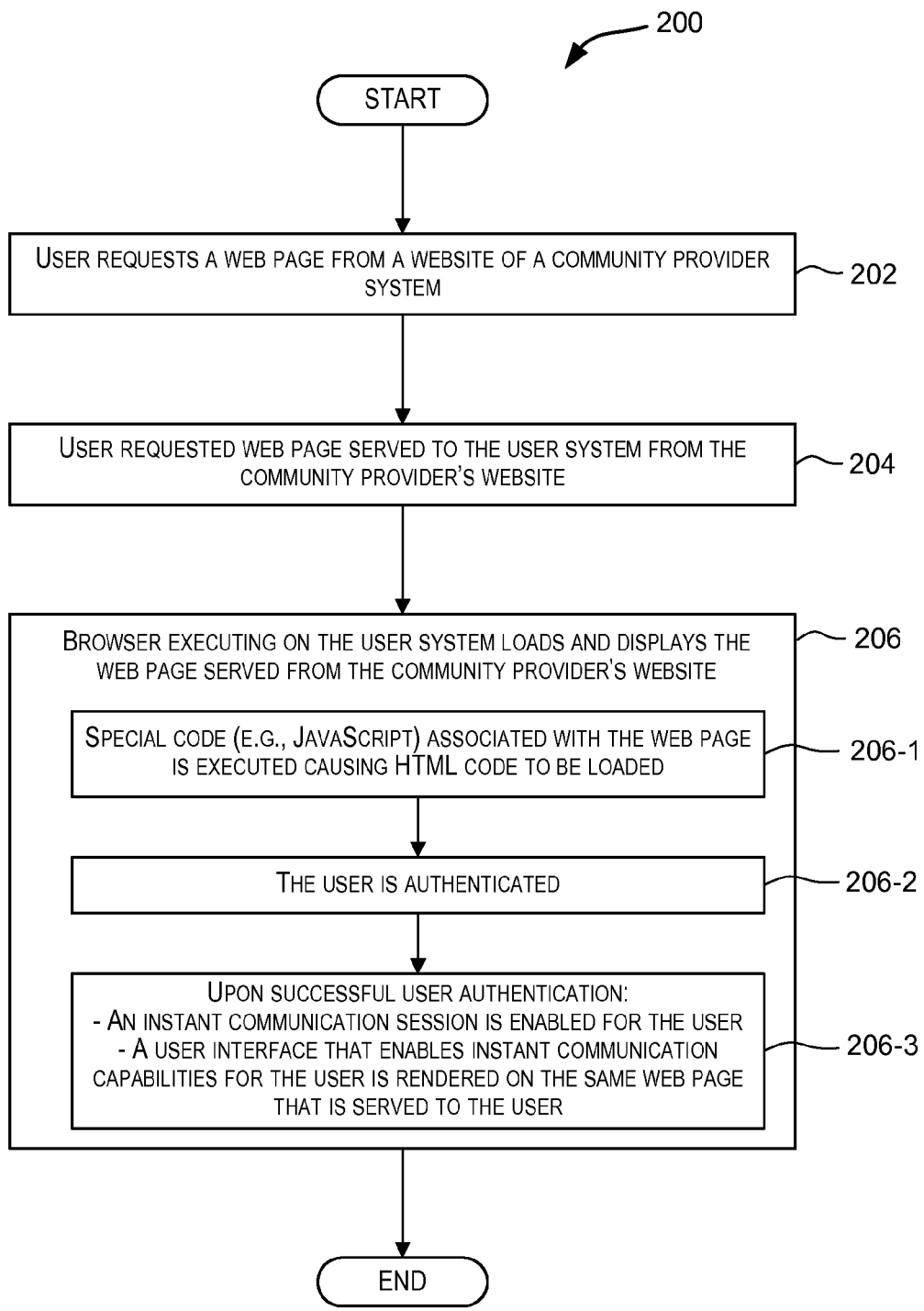
FIG. 2 is a simplified flowchart depicting a high level method performed at runtime for enabling instant communication for a user member of a community according to an embodiment of the present application.

FIG. 2 is a simplified flowchart 200 depicting a high level method performed at runtime for enabling instant communication for a user member of a community according to an embodiment of the present application. The method depicted in FIG. 2 may be performed by software (e.g., program, code, instructions executed by a processor), in hardware, or combinations thereof. The software may be stored on a computer-readable storage medium.

Runtime processing may be initiated when a user, who is a member of a community, uses an application such as a browser executing on a user system to request a web page from a website of a community provider system (step 202). The user may request the web page by providing the URL for the web page to the browser. Alternatively, the web page may be requested as a result of the user clicking on a link on another web page already loaded by the browser.

The web page requested by the user is then served to the user system from the community provider's website (step 204). The browser executing on the user system then loads and displays the received web page (step 206). Several processing steps are triggered by the loading of the web page. As a result of the loading, the special code (e.g., JavaScript code) associated with the web page is executed (step 206-1) and causes code to be loaded that enables instant communication services. As described above, in one embodiment, loading of the code on a web page served from a website of a community provider system creates a user interface (the user interface that enable instant communication, e.g., instant communication user interface 407 depicted in FIG. 4 and described below) also defines a set of APIs (JavaScript APIs) for the webpage to interface with, creating new functionality that is better integrated with the user experience. These APIs may be used for communicating with ICFS 106.

The user requesting the web page is then authenticated to determine whether instant communication capabilities are to be provisioned for the user (step 206-2). Upon successful authentication, an instant communication session is enabled for the user and a user interface that enables instant communication capabilities for the user is rendered on the same web page that is displayed to the user (step 206-3). In one embodiment, a user interface such as the user interface depicted in FIG. 4 and described below is displayed to the user.

Figure 3:
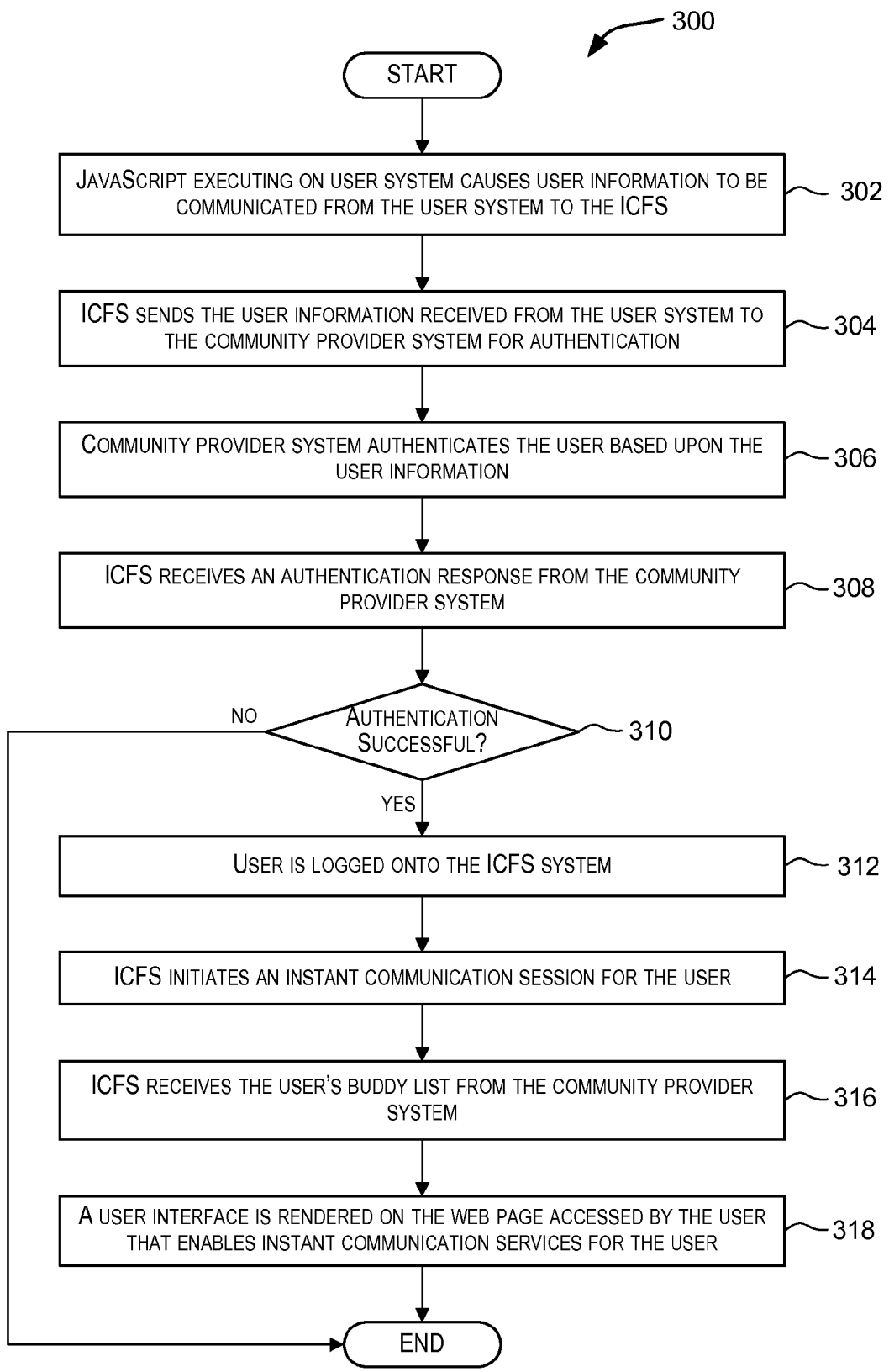
FIG. 3 is a simplified flowchart depicting a method for performing user authentication and enabling of instant communication capabilities according to an embodiment of the present application.

FIG. 3 is a simplified flowchart 300 depicting a method for performing user authentication and enabling of instant communication capabilities according to an embodiment of the present application. The method depicted in FIG. 3 may be performed by software (e.g., program, code, instructions executed by a processor), in hardware, or combinations thereof. The software may be stored on a computer-readable storage medium.

As depicted in FIG. 3, the JavaScript that is associated with a web page accessed by a user from the community provider's website and executed by the user system upon loading of the web page causes user information to be communicated from the user system to ICFS 106 (step 302). As described above, in one embodiment, loading of the code on a web page served from a website of a community provider system creates a user interface (the user interface that enables instant communication, e.g., instant communication user interface 407 depicted in FIG. 4 and described below) also defines a set of APIs (JavaScript APIs) for the webpage to interface with, creating new functionality that is better integrated with the user experience. These APIs may be used for communicating with ICFS 106.

In one embodiment, the user information is stored on the user system by the community provider system when the user successfully logs on to the website of the community provider system. The user information may be stored in the form of a cookie on the user system. In such an embodiment, information from the cookie is communicated from the user system to ICFS 106 in 302. When a user ends the session with the community provider website (e.g., when the user logs out from the community provider website, the cookie stored on the user system is cleared.

The user information communicated to ICFS 106 in 302 comprises information that can be used to authenticate the user. In one embodiment, the user information that is communicated comprises a user identifier (UID) that uniquely identifies the user and an authentication token. The token may be unique to both the user and the user's session with the community provider's website. An example of a token is a hash of the user's ID and either a session key (if already created) or the time stamp of the user's last login in the community provider website. The token should be valid for at least as long as the user's session on the community provider system is valid.

The user information received by ICFS 106 from the user system in 302 is then communicated to the community provider system for authentication (step 304). APIs provided by the community provider system may be used by ICFS 106 to request the authentication. The community provider system then authenticates the user based upon the user information received from ICFS 106 (step 306). In one embodiment, as part of the authentication, the community provider system checks if the user identified by the user information is part of the community maintained by the community provider system.

ICFS 106 then receives an authentication response from the community provider system (step 308). ICFS 106 then checks to see if authentication response received from the community provider system indicates a successful authentication (step 310). If it is determined in 310 that authentication was not successful, then the processing ends and instant communication services are not enabled for the user. If it is determined in 310 that authentication was successful then processing continues with step 312.

Upon successful authentication, the user is logged on to ICFS 106 (step 312). In this manner, the user is automatically logged on to ICFS 106 without the user having to perform an explicit logon procedure with ICFS 106. ICFS 106 then initiates an instant communication session for the user (step 314). ICFS 106 receives a friend list for the user from the community provider system (step 316). In one embodiment, the friend list is received as part of a successful authentication response in 308. In another embodiment, ICFS 106 may invoke an API provided by the community provider system to request the friend list for the user. The friend list is then communicated from the community provider system to ICFS 106 in the response to the API call.

ICFS 106 then causes a user interface that enables instant communication capabilities for the user to be rendered on the web page accessed by the user (step 318). In one embodiment, the user interface is overlayed on the web page displayed to the user. In this manner, the user interface for enabling instant communications is displayed on the same page served to the user from the community provider system. In one embodiment, the user interface comprises a bar comprising tools and showing status of the user's instant communication session. The user's friend list received in 316 may also be displayed as part of the user interface.

Figure 4:
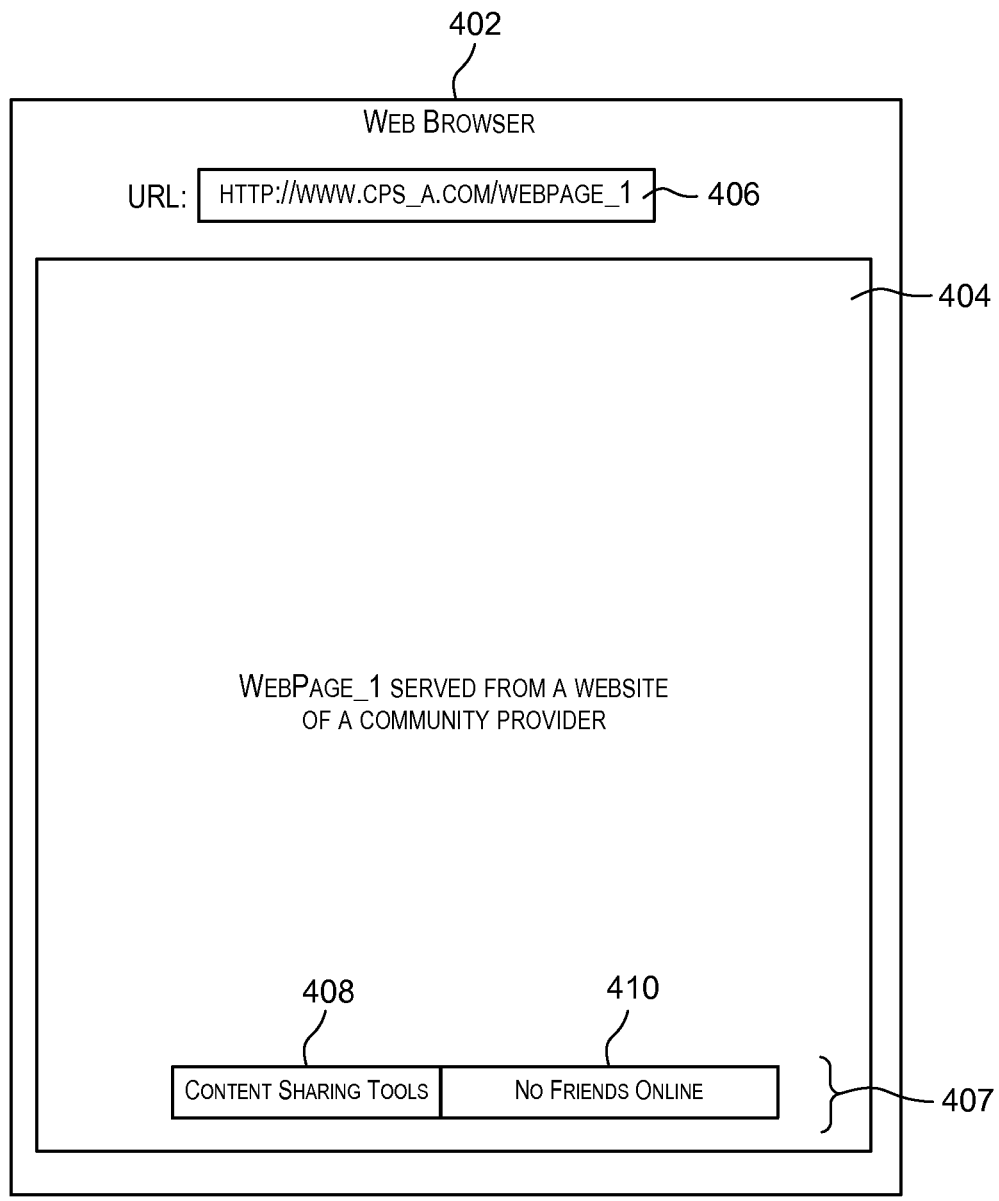
FIGS. 4-7 depict examples of instant communication user interfaces that may be displayed to a user according to an embodiment of the present invention.

FIG. 4 depicts an example of an instant communication user interface that may be displayed for a user to enable instant communication services for the user. As depicted in FIG. 4, a browser 402 executing on a user system displays a web page 404 served from a website of a community provider system. In the example depicted in FIG. 4, WebPage_1 is served from the website of the community provider. The URL 406 corresponding to the displayed web page is displayed by browser 402. An instant communication user interface 407 that enables instant communications for the user is also displayed on web page 404. In the embodiment depicted in FIG. 4, user interface 407 (in the form of a "bar") is overlayed on web page 404 displayed by browser 404.

In FIG. 4, user interface 407 comprises a first section 408 comprising a set of content sharing tools. The content sharing tools may include user-selectable tools that enable content from the displayed web page, or the web page itself, to be shared with other members of the community. User interface 407 comprises a second section 410 that shows the status of the user's friends in the online community. In the example depicted in FIG. 4, none of the user's friends (i.e., no one from the user's friend list) are online, as indicated by the "No Friends Online" status.

Figure 5:
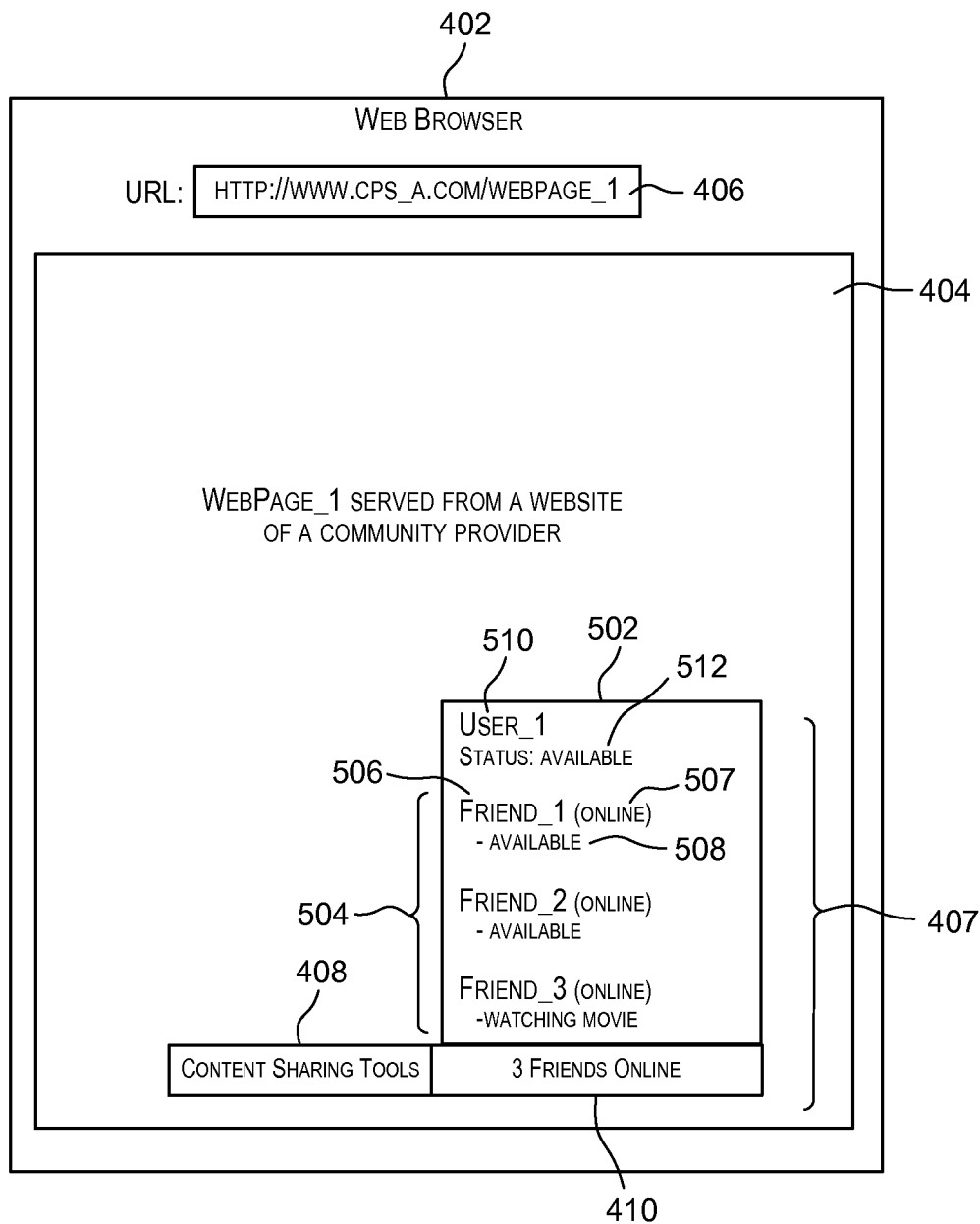

Once one or more of the user's friends come online, the status displayed by section 410 is updated to reflect who is online. For example, as depicted in FIG. 5, the status displayed in section 410 of user interface 407 has been updated to reflect that three of the user's friends are now online. User interface 407 is updated to display another area/window 502 that displays a list 504 of friends who are online. As depicted in FIG. 5, each friend is identified by the friend's username or real name 506. Further, presence information 507 and status information 508 is displayed for each friend. Presence information 507 may indicate whether the friend is online or offline. In one embodiment, for each instant communication session for a user, ICFS 106 stores presence information and status for the user and also for each friend in the user's friend list. Status information 508 may be set by the friend to reflect the friend's status such as "available", "busy", "watching movie", "do not disturb", etc. The name 510 of the user and the user's status 512 are also displayed.

In one embodiment, the community provider system uses APIs provided by ICFS 106 to convey information to ICFS 106 about the status of the user's friends. Based on the status information received from the community provider system, ICFS 106 causes the status information for the user's friends to be updated in user interface 407.

Figure 6:
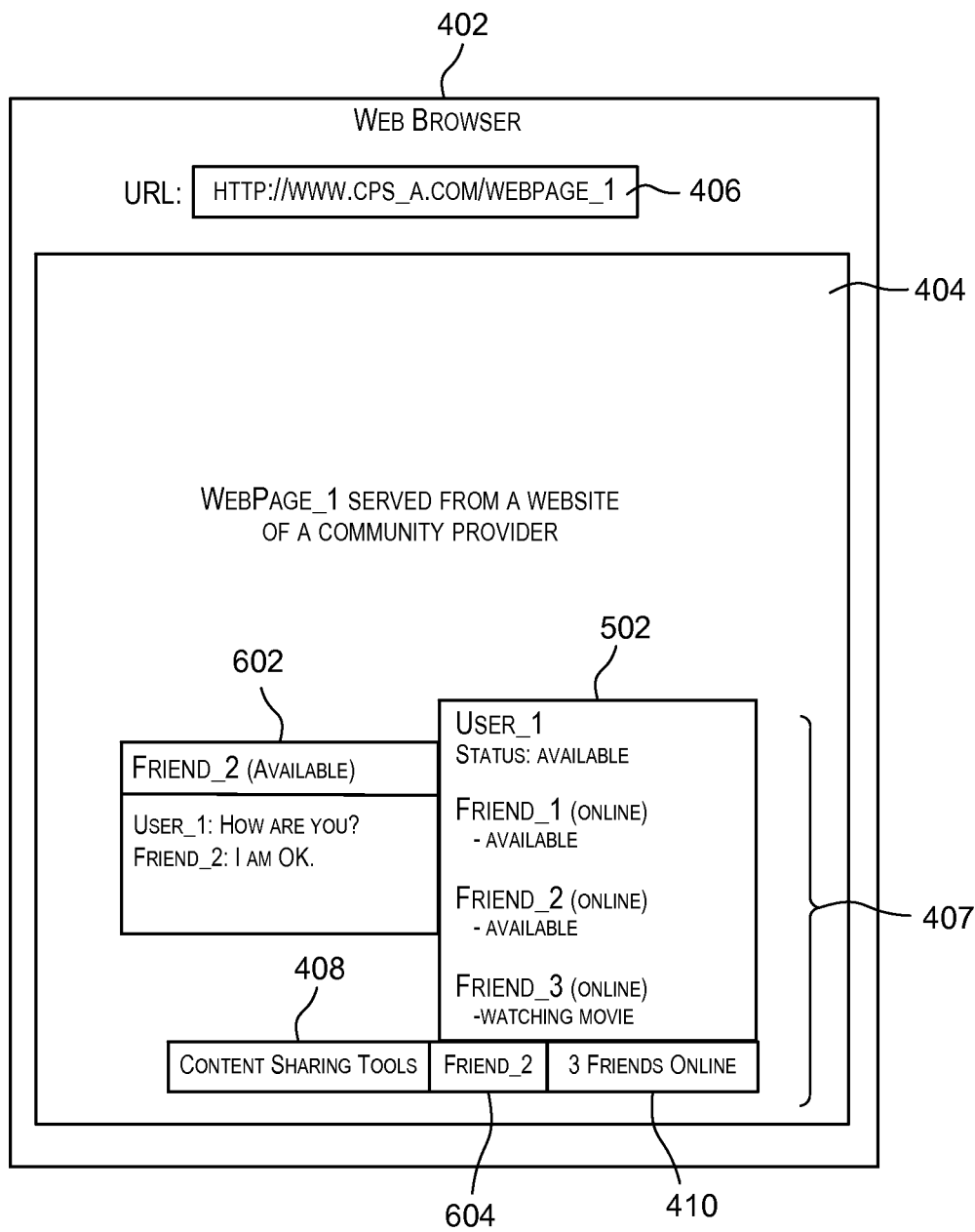

The user may decide to open a chat session with one or more friends displayed in window 502. In one embodiment, the user may open a chat session with a friend by clicking on the friend's name in window 502. For example, as depicted in FIG. 6, the user has opened a chat session with Friend_2. As a result, user interface 407 is updated to display an IM chat window 602 in which the user can send messages to Friend_2 and receive messages sent by Friend_2. A section 604 is also displayed in the bar section of user interface 407 to identify the friend with whom the user service is having a chat. A chat session may also be initiated by another user who sends a message to the first user. This will also cause chat window 602 to appear.

After an instant communication session has been initiated for a user member of a community, ICFS 106 stores session state information for the instant communication session. Accordingly, for a community of users, ICFS 106 stores session state information for each member user involved in an instant communication session. In one embodiment, this information is stored as part of communication session state information 126 depicted in FIG. 1. As previously described, in one embodiment, the instant communication session status information stored for a member of a community may comprise information such as: (a) status information for the member (e.g., available, busy, etc.); (b) presence information for the member identifying a state related to the user's presence (e.g., whether the member is online or offline, etc.); (c) information related to messages sent by or received by the member; (d) information related to notifications received by the member; (e) a session ID for the user; (f) information related to the user's friends including status of the friends; (g) the user's profile information such as information about the user, the user's name, a photo/icon to be displayed for the user, etc.; and (h) other information related to the member user's session.

Figure 7:
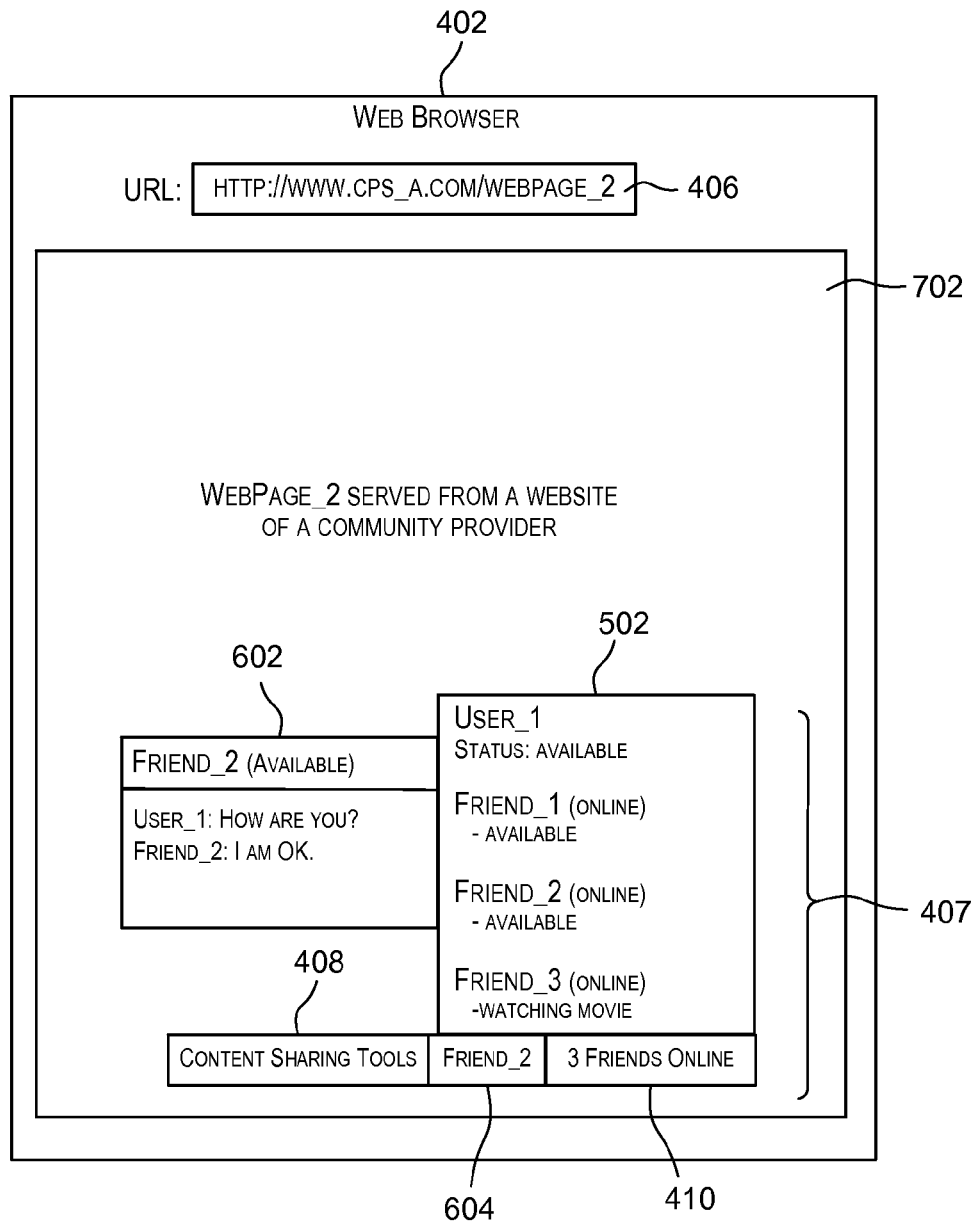

The instant communication session state information stored by ICFS 106 for a user enables ICFS 106 to cause the state of the user interface displayed to a user to be maintained or preserved across multiple page views served from the website of the community provider system to the user. For example, the current state of the instant communication user interface for a user may be as shown in FIG. 6 wherein instant communication user interface 407 is rendered on a web page "WebPage_1". The user may subsequently access another web page served from the website of the community provider website. For example, as depicted in FIG. 7, the user has accessed "WebPage_2" 702 served from the website of the community provider system. The URL corresponding to the second web page is displayed in 406. Based upon the instant communication session state information stored for the user, ICFS 106 causes the instant communication user interface 407 that was rendered on WebPage_1 to be also rendered on WebPage_2. In this manner, the state of the instant communication user interface is maintained across multiple page views. The multiple page views may be pages that are sequentially accessed by the user or multiple pages that are concurrently loaded by the browser in different tabs. Accordingly, the session state information stored by ICFS 106 is used by ICFS 106 to preserve the state of a user's instant communication session across multiple page-views served to the user from the website of a community provider system. The session state information may also be used to synchronize state between sessions on separate computers.

Figure 8:
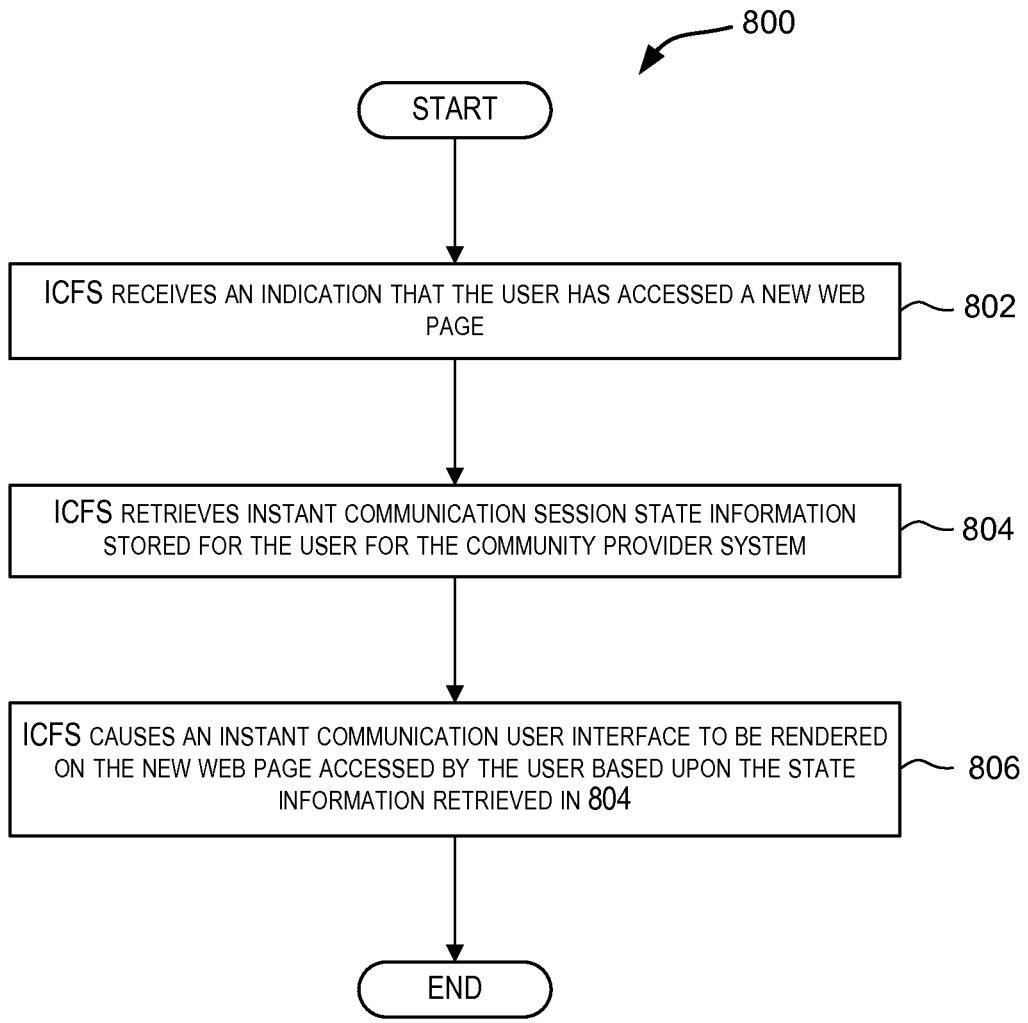
FIG. 8 is a simplified flowchart depicting a method for preserving the state of the instant communication user interface across multiple page views according to an embodiment of the present application.

FIG. 8 is a simplified flowchart 800 depicting a method for preserving the state of the instant communication user interface across multiple page views according to an embodiment of the present application. The method depicted in FIG. 8 may be performed by software (e.g., program, code, instructions executed by a processor), in hardware, or combinations thereof. The software may be stored on a computer-readable storage medium.

The method may be triggered when ICFS 106 receives an indication that the user has accessed a new web page from the website of a community provider system (step 802). In one embodiment, ICFS 106 receives a notification from the community provider system whenever a new web page is accessed by the user from the website of the community provider system. In another embodiment, ICFS 106 may receive a signal from the user system indicating that the user is viewing a new page view. ICFS 106 then retrieves the instant communication session state information stored for the user for the community provider system (step 804). ICFS 106 then causes an instant communication user interface to be rendered on the new web page based upon the state information retrieved in 804 (step 806). In one embodiment, the user interface is overlayed on the newly accessed web page. The user interface that is displayed to the member thus preserves the state of the member's instant communication session. This enables the state of a user's instant communication session to be preserved across multiple page views served from the community provider system. The multiple page views may correspond to web pages accessed sequentially by the user. The multiple page views may also include different web pages that may be loaded concurrently in different tabs of a browser.

In one embodiment, notifications sent to a user by another community member (e.g., a friend in the user's friend list) may also be delivered and displayed to the user via the instant communication user interface. A notification typically takes the form <subject><predicate>. For example, a notification might be "Friend_2 has challenged User_1 to a Sudoku game." Here, the subject is "Friend_2" and the predicate is "has challenged User_1 to a Sudoku game." The subject may be another user member of the community maintained by the community provider system who the recipient user may wish to hear notifications about. In one embodiment, in order to reduce spamming of notifications, a notification from a community member is only delivered to the user if the subject is in the user's friend list, or the user is mentioned in the predicate. The predicate of a notification message may be a text string that may contain html links. For example, the word "Sudoku game" in the above example might be a link to a page corresponding to the Sudoku game.

In one embodiment, ICFS 106 receives notifications for a user from the community provider system. For example, when a user has been successfully authenticated, the community provider system may communicate a set of notifications for the user to ICFS 106. These notifications are then displayed in the instant communication user interface rendered on the web page displayed to the user. In one embodiment, ICFS 106 automatically turns the subject's name in a notification message into a link which when selected by the user enables the user to begin an IM conversation with the subject. ICFS 106 may regularly poll the community provider system (or other data sources storing or having access to the notifications) for new notifications that are received for the user. The instant communication user interface is then updated to display the new notifications.

In one embodiment, each notification is assigned a unique id by ICFS 106. ICFS 106 uses these notification ids to avoid displaying duplicate notifications. Once a notification has been received by ICFS 106 and displayed to the user, ICFS 106 may notify the community provider system as to which notifications have been displayed. Accordingly, when the community provider system receives a request from ICFS 106 for notifications for the user only the new notifications are communicated by the community provider system to ICFS 106.

ICFS 106 may use APIs provided by the community provider system to request information related to notifications and to notify the community provider system of notifications that have been displayed to the user. The community provider system may use APIs provided by ICFS 106 to convey notifications-related information to ICFS 106. Details related to APIs that may be used are provided below.

Figure 9:
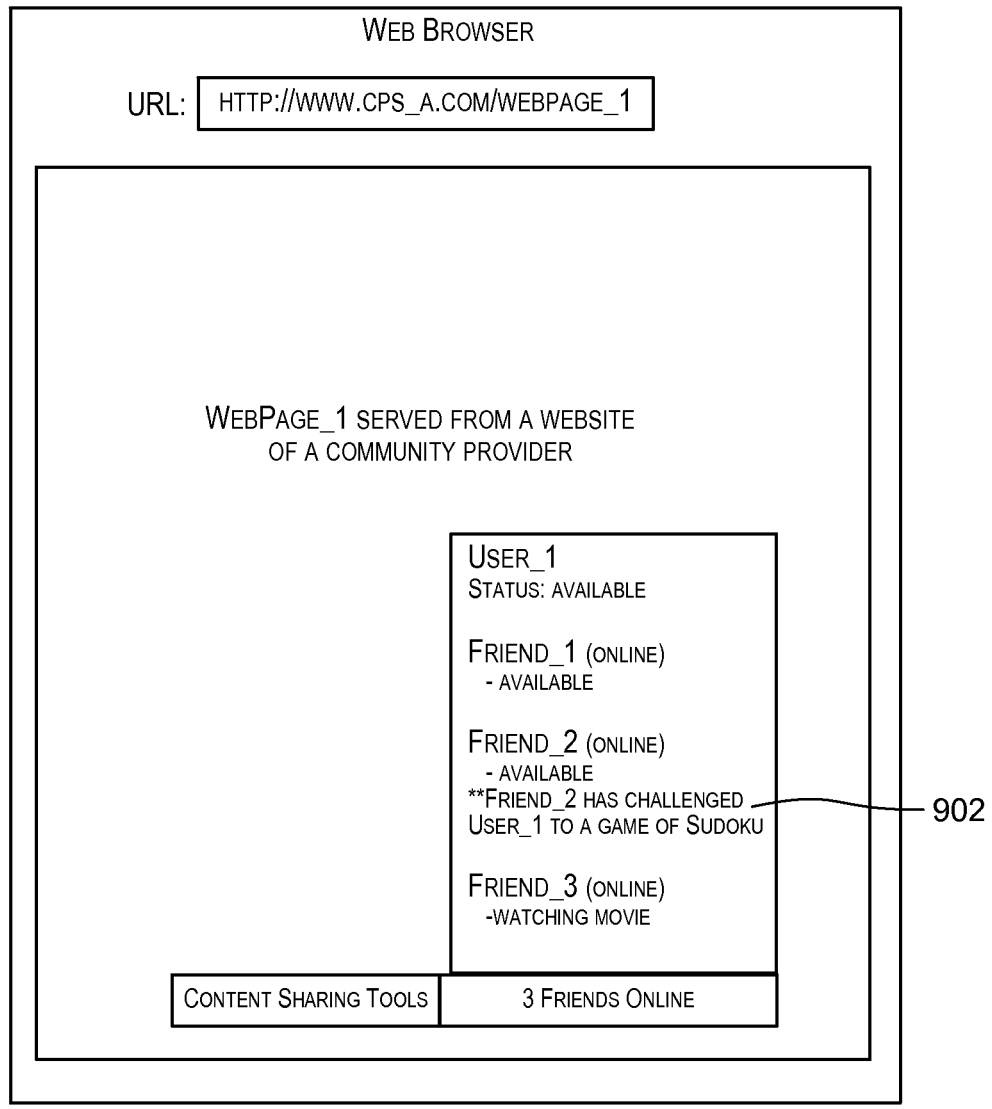
FIG. 9 depicts an example of how notifications are displayed in an instant communication user interface according to an embodiment of the present invention.

FIG. 9 depicts an example of how notifications are displayed in the instant communication user interface according to an embodiment of the present invention. As depicted in FIG. 9, a notification "Friend_2 has challenged User_1 to a game of Sudoku" 902 is displayed in the instant communication user interface. The subject's name ("Friend_2") in the notification message may be a link which when selected by the user enables the user to begin an IM conversation with the subject. The predicate of the notification message may contain html links. For example, the word "Sudoku game" in the above example might be a link to a page corresponding to the Sudoku game. In the embodiment depicted in FIG. 9, the notifications are displayed in the same window that displays the friend list. In an alternative embodiment, the notifications received by a user may be displayed in a separate window from the window displaying the user's friends.

Web Service APIs

As indicated above, a set of Web Service APIs are provided that enables a community provider system and ICFS 106 to communicate with each other. The Web Service APIs include a set of community provider Web Service APIs (CPS_APIs) and a set of ICFS Web Service APIs (ICFS_APIs). The CPS_APIs comprise APIs that ICFS 106 may call to request information from or communicate information to a community provider system. CPS_APIs may also include APIs that ICFS 106 may call to cause the community provider system to perform a task or operation. The ICFS_APIs comprise APIs that a community provider system may invoke to request information from or communicate information to ICFS 106. ICFS_APIs may also include APIs that a community provider system may call to cause ICFS 106 to perform a task or operation.

ICFS Web Service APIs (ICFS_APIs)

In one embodiment, the ICFS_APIs allow a community provider system to make calls to ICFS 106 to notify ICFS 106 of events such as:

a friend is added to a user's friend list
    a friend is removed from a user's friend list
    status of a user has changed
    an image to be displayed for a user has changed
    to deliver a notification of the user's friend's activities on the site
    a user has logged out of the community provider site In addition, a community provider system may submit queries to ICFS 106 using ICFS_APIs to obtain information from ICFS 106 such as:

current logged-in user count
    online status for specific users

In one embodiment, a community provider system may make requests to the ICFS_APIs over HTTPS. Access to ICFS_APIs may be restricted to a specific community provider. ICFS 106 authenticates HTTP requests received from a community provider system using HTTP authentication via a username and password provided to the community provider system. A community provider system may make calls to URLs of the form:

https://cim-api.ICFS.com/api/communityim/v1/command where command is one of the commands described below. So, for example, a community provider system may notify ICFS 106 of a friend addition to a user's friend list by making a request to the URL:

https://cim-api.ICFS.com/api/communityim/v1/addfriend

An ICFS_API call made by a community provider system may generate a response from ICFS 106 to the calling community provider system. In one embodiment, all commands return a JSON-formatted string. Non-ASCII characters may be encoded using the utf-8 character set. Each response comprises a status field (stat field) which takes on a string value of either "OK" or "FAIL". A "FAIL" value is returned when ICFS 106 is unable to process the command requested by the community provider system. This may be due to an invalid command or some other error at ICFS 106. When a failure occurs, the response may additionally include the following fields:

an errorcode—This may be an integer representing the type of error. In one embodiment, this is similar to http errors, for example, the errorcode is set to 400 if there is a problem with the command request received from the community provider system and is set to 500 if there is a problem on ICFS 106. Other errorcodes may also be defined.

a msg—This is an error message describing the problem that occurred. This message is typically useful for debugging the source of the error. In one embodiment, the error message is used internally by a community provider system and ICFS 106 for diagnostic purposes and is not displayed to an end user member of the community maintained by the community provider system).

For example, a sample failure response may be as follows:

{"stat":"fail", "errorcode":500, "msg":"error message describing the problem"}

An "OK" is returned when the command requested by the community provider system is properly handled by ICFS 106. An "OK" response may also additionally include the following field:

data—This comprises additional data which is defined to be present in a successful response. In one embodiment, the data is a JSON object.

For example, a sample "OK" response may be as follows:

{"stat":"ok", "data":{"field1":"value1", "field2":5}}

The following section describes various actions that may be performed by making calls to ICFS_APIs. These APIs are merely examples and are not intended to limit the scope of the invention as recited in the claims.

(1) Notify ICFS 106 that a Friend has been Added to a User's Friend List

A community provider system makes a POST request to the "addfriend" method at:

https://cim-api.ICFS.com/api/communityim/v1/addfriend

The parameters are:

uid—The uid of the online user whose friend list has changed.

frienduid—The uid of the friend being added.

friendname—The "friendly name" of the friend being added.

A community provider system may call this API every time an online user has a new friend added. When friendship is established between two user members of the community who are both online, two calls should be made—one for each user.

If the request is validly formatted, the response is:

{"stat":"ok"}

(2) Notify ICFS 106 that a Friend has been Removed from a User's Friend List A community provider system may make a POST request to the "removefriend" method at:

https://cim-api.ICFS.com/api/communityim/v1/removefriend

The parameters are:

uid—The uid of the online user whose friend list has changed.

frienduid—The uid of the friend being removed from the user's friend list.

The community provider system may make this call every time an online user has a friend removed. Thus, if friendship is broken between two users who are both online, two calls should be made—one for each user.

If the request is validly formatted, the response is:

{"stat":"ok"}

(3) Update the Status of a User

When an online user's status message changes, the community provider system may notify ICFS 106 of the change by making a POST request to: https://cim-api.ICFS.com/api/communityim/v1/updatestatus The parameters are:

uid—The uid of the user.

status—The new status message. The status parameter may be omitted to clear a user's status message.

If the request is validly formatted, the response is:

{"stat":"ok"}

(4) Update the User Image to be Displayed for a User

In one embodiment, an image may be displayed for a user in the user interface for instant communications. When an online user's image changes, a community provider system may notify ICFS 106 of the change by making a POST request to: https://cim-api.ICFS.com/api/communityim/v1/updateimage The parameters are:

uid—The uid of the user.

imagedata—A multipart/form-data encoded binary data of an image that should be shown for the user.

imagetype—A string describing the file format of the image. In one embodiment, the format may be one of "jpg", "gif", "png", "bmp".

imageurl—A URL for image that should be shown for the user.

The image can be submitted as either a URL or as the raw data. Only one of imagedata or imageurl need to be specified. The imagedata and imageurl parameters may be omitted to clear a user's image.

If the request is validly formatted, the response is:

{"stat":"ok"}

(5) Deliver Notification to ICFS 106

A community provider system can deliver notifications about users' friends' activities to one or more online users. Notifications may take the form <subject><predicate>. For example, a notification might be "Chris sent you a message." The subject is "Chris" and the predicate is "sent you a message." The subject may be another user member of the community maintained by the community provider system who the recipient user may wish to hear notifications about. The predicate is a text string that can contain html links. For example, the word "message" might be a link to the page where the user can view the message. ICFS 106 automatically turns the subject's name into a link which enables a user to begin an IM conversation with the subject. Notifications are typically only sent to a user if the subject is in the user's friend list, or the user is in the predicate.

In one embodiment, two types of notifications may be delivered:

friend—This means the friend is intentionally broadcasting a message. The icon of the user (if currently online) may be displayed next to the message.

network—This means the network is broadcasting a message on behalf of the subject user. The icon of the network may be displayed next to the message.

The types of notification may be used to allow users to indicate which kinds of notifications they prefer to see in order to display the most relevant notifications from the people they are most interested in.

In one embodiment, each notification is assigned a unique id that ICFS 106 uses to avoid displaying duplicate notifications. When a user logs into the website of the community provider and is successfully authenticated by ICFS 106, ICFS 106 may request any notifications for that user. ICFS 106 will also notify the community provider system when the notifications are read. Thus, the community provider system may optionally store notifications based on the ID and keep track of which ones have already been read. If the community provider system does not wish to store notifications, it can simply return only new ones in real time with a unique notification id generated at that time.

To deliver a notification, a community provider system may make a POST request to:

https://cim-api.ICFS.com/api/communityim/v1/deliver-notification

The parameters are:

uid—A comma-separated list of uids of users receiving the notification.

type—A notification type, either "friend" or "network."

notificationid—A unique id of the notification, can contain letters, numbers, hyphen, underscore, period, and percent symbol.

timestamp—A timestamp (in seconds) when the notification event occurred.

subjectuid—The uid of the subject.

subjectname—The "friendly name" of the subject.

predicate—A string to display for verb phrase (may contain link tags).

If the request is validly formatted, the response is:

{"stat":"ok"}

(6) Notify ICFS of User Logout

When a user logs out of the website provided by a community provider system, the community provider system may send a notification to ICFS 106 so that ICFS 106 can end the user's instant communication session. To do so, the community provider system may make a POST request to:

https://cim-api.ICFS.com/api/communityim/v1/logout

The parameters are:

uid—The uid of the user who has logged out.

If the request is validly formatted, the response is:

{"stat":"ok"}

(7) Concurrent User Count

A community provider system may obtain a count of the number of users from the community maintained by the community provider system that are currently logged-in in instant communication sessions facilitated by ICFS 106. The community provider system may obtain this information my making a GET request to:

https://cim-api.ICFS.com/api/communityim/v1/usercount

The response will be of the form

{"stat":"ok", "data":{"count":100}}, where count takes on an integer value.

(8) Get User Presence

ICFS 106 is configured to maintain presence information for each user of a community involved in an instant communication session facilitated by ICFS 106. A community provider system may find out the login-status of particular users by making a GET request to:

https://cim-api.ICFS.com/api/communityim/v1/userpresence

The parameters are:

uid—A comma-separated list of uids of users for whom presence information is requested.

If the request is validly formatted, the response is:

{"stat":"ok", "data":{"users":[{"uid":"123", "online":true}, {"uid":"456", "online":false}]}} where, "users" is a list of user objects, where each user object contains two fields: "uid" which contains the uid of the user enquired about, and "online" which is a Boolean indicating whether the user is online.

Community Provider System Web Service APIs (CPS_APIs)

In one embodiment, the CPS_APIs allow ICFS 106 to request information from a community provider system and to cause certain operations to be performed by the community provider system. For example, ICFS 106 may call these APIs to perform operations such as:

authenticate a user get a list of friends of a user from the community provider system get information about a user from the community provider system check if a user exists notify the community provider system of a status message change report to the community provider system that certain notifications have been read notify the community provider system when a user has requested to add another user as a friend report when a user has blocked another user from IM notify when a user has reported abusive behavior from another user.

In one embodiment, ICFS 106 may make requests to the CPS_APIs over HTTPS. Access to CPS_APIs may be restricted to ICFS 106. ICFS 106 authenticates HTTP requests using HTTP authentication via a username and password provided by the community provider system. ICFS 106 may make calls to URLs of the form:

https://community_provider_system_server/baseurl/v1/command where "community_provider_system_server" is a host name provided by the community provider system and "baseurl" is the base portion of the URL (e.g. api). In one embodiment, ICFS 106 appends "/v1/command" to the host name and base url provided by the community provider system, where command is the name of the requested operation. For example, ICFS 106 might make a request to authenticate a username by making a request to the URL:

https://meeboapi.community_provider_system.com/api/v1/authenticateusername or https://community_provider_system.com/api/v1/authenticateusername A CPS_API call made by ICFS 106 may generate a response from ICFS 106 to the calling community provider system. In one embodiment, all commands return a JSON-formatted string. Non-ASCII characters may be encoded using the utf-8 character set. Each response comprises a status field (stat field) which takes on a string value of either "OK" or "FAIL". A "FAIL" value is returned when the community provider system is unable to process the command requested by ICFS 106. This may be due to an invalid command request or some other error at the community provider system. When a failure occurs, the response may additionally include the following fields:

an errorcode—This may be an integer representing the type of error. In one embodiment, this is similar to http errors, for example, the errorcode is set to 400 if there is a problem with the command request received from ICFS 106 and is set to 500 if there is a problem on the community provider system. Other errorcodes may also be defined.

a msg—This is an error message describing the problem that occurred. This message is typically useful for debugging the source of the error. In one embodiment, the error message is used internally by a community provider system and ICFS 106 for diagnostic purposes and is not displayed to an end user member of the community maintained by the community provider system).

For example, a sample failure response may be as follows:
{"stat":"fail", "errorcode":500, "msg":"error message describing the problem"}

An "OK" is returned when the command requested by the community provider system is properly handled by ICFS 106. An "OK" response may also additionally include the following field:

data—This comprises additional data which is defined to be present in a successful response.

In one embodiment, the data is a JSON object.

For example, a sample "OK" response may be as follows:
{"stat":"ok", "data":{"field1":"value1", "field2":5}}

The following section describes various actions that may be performed by making calls to CPS_APIs. These APIs are merely examples and are not intended to limit the scope of the invention as recited in the claims.

(1) User Authentication

As previously described, ICFS 106 authenticates a user prior to enabling instant communications for the user. In one embodiment, ICFS 106 may authenticate a user using one of the following:
 a username and password
 a UID and password
 a UID and token provided by the community provider system when the user is logged into the community provider system website In one embodiment, when a user authenticates, the community provider system may choose to return a community provider session key. This community provider session key may be provided as a parameter to subsequent requests associated with this user's session. In this way, the community provider system can use the session key as an authentication mechanism for subsequent requests. It should be noted that this authentication mechanism is optional.

(a) Authenticate a Username

ICFS 106 may make a POST request to the "authenticateusername" method at:
 https://community_provider_system_server/baseudl/v1/authenticateusername The parameters are:
 username—The user's username to be authenticated.
 password—The user's password.

If user is successfully authenticated, the resulting message may be:
{"stat":"ok","data":{"authenticated":true, "uid":"uidvalue", "name":"Person's name", "community_provider_system_sessionkey":"community_provider_system_sessionkeyvalue"}}
where "uidvalue" is the user's UID; "name" is the user's friendly name; "community_provider_system_sessionkey" is an optional session key assigned by the community provider system. If the community provider system requires it for authentication for subsequent requests, it should be included; otherwise it may be omitted.

If user is not successfully authenticated, the resulting message is:
{"stat":"ok","data":{"authenticated":false}}

(b) Authenticate a UID

ICFS 106 may make a POST request to the "authenticateuid" method at:
 https://community_provider_system_server/baseurl/v1/authenticateuid The parameters are:
 uid—The user's UID.
 password—The user's password.

If user is successfully authenticated, the resulting message may be:
{"stat":"ok","data":{"authenticated":true, "uid":"uidvalue", "name":"Person's name", "community_provider_system_sessionkey":"community_provider_system_sessionkeyvalue"}}
where, "uidvalue" is the user's UID; "name" is the user's friendly name; "community_provider_system_sessionkey" is an optional session key assigned by the community provider system. If the community provider system requires it for authentication for subsequent requests, it should be included; otherwise it may be omitted.

If user is not successfully authenticated, the resulting message may be:
{"stat":"ok","data":{"authenticated":false}}

(c) Authenticate a Token

ICFS 106 may make a POST request to the "authenticatetoken" method at:
 https://community_provider_system_server/baseurl/v1/authenticatetoken The parameters are:
 uid—The user's uid.
 token—The token that serves as a temporary password, good for at least the duration of this session.

If user is successfully authenticated, the resulting message may be:
{"stat":"ok","data":{"authenticated":true, "uid":"uidvalue", "name":"Person's name", "community_provider_system_sessionkey":"community_provider_system_sessionkeyvalue"}}
where, "uidvalue" is the user's UID; "name" is the user's friendly name; "community_provider_system_sessionkey" is an optional session key assigned by the community provider system. If the community provider system requires it for authentication for subsequent requests, it should be included; otherwise it may be omitted.

If user is not successfully authenticated, the resulting message may be:
{"stat":"ok","data":{"authenticated":false}}

(2) Get Friend List

In order to get a user's friend list from a community provider system, ICFS 106 may make a GET request to the "getfriends" method at:
 https://community_provider_system_server/baseurl/v1/getfriends The parameters are:
 uid—The user's uid.
 community provider system sessionkey—(optional) A session key provided by the community provider system when user authenticated. This is included only if the community provider system provided it to ICFS 106 in an authentication response.

friendtimestamp—(optional) A timestamp (in seconds) of ICFS 106's last snapshot of the friend list. This may only be included when ICFS 106 has a snapshot of the friend list and knows when the snapshot was captured. Community provider system may choose to use this, when it is included, to indicate whether the friend list is up-to-date.

There are 2 types of successful responses that are possible, and the type of response is indicated by the "friendresponse" field of the data object. If the community provider system wishes to indicate that the friend list is up-to-date based on the timestamp provided and no changes are necessary, the resulting message may be:

{"stat":"ok","data":{"friendresponse":"uptodate"}}

If the community provider system wishes to return the full friend list (because the list is out of date according to the timestamp, a timestamp was not provided by ICFS 106, or the community provider system does not support tracking a last-updated time for the friend list), the resulting message may be of the form:

{"stat":"ok","data":{"friendresponse":"full", "friends": [{"uid":"uidvalue1", "name":"Friend number one's name"}, {"uid":"uidvalue2", "name":"Friend number two's name"}]}} where, "friends" is a list of JSON objects, where each object is a friend. Each friend object may comprise 2 fields: "uid" containing the friend's uid and "name" containing the friend's friendly name.

(3) Get User Information

To get information about a user from a community provider system, ICFS 106 may make a GET request to the "getinfo" method at:

https://community_provider_system_server/baseudl/v1/getinfo

The parameters are:

uid—The user's uid.

community provider system sessionkey—(optional) A session key provided by the community provider system when user authenticated, included only if the community provider system provided it to ICFS 106 in authentication response Response may be of the form:

{"stat":"ok","data":{"imagedata": "base64encodedstring", "imagetype":"imagetypestring", "status":"user's status", "age":21, "gender":"m"}} where data contains any of the following fields:

imagedata—An image to be shown for the user. For example, this field may be a base64 (rfc 3548) encoding of an image that should be shown for the user.

imagetype—A string describing the file format of the image. In one embodiment, the type may be one of "jpg", "gif", "png", "bmp".

imageurl—A URL for an image to be shown for the user.

status—A status message for the user.

age—The age of the user expressed as an integer, in years.

gender—The gender of the user represented as a 1-character lowercase string, either "m" or "f".

country—A 2 letter country code, e.g. "us"

userinterests—A set of declared user interests, represented as a JSON object containing key-value pairs.

notifications—A list of JSON objects, each one describing a notification that should be displayed to the user.

Each notification JSON object may contain the fields: type, notificationid, timestamp, subjectuid, subjectname, predicate. For example, a single notification object might take the form:

{"type":"friend", "notificationid":"12345abc", "timestamp":1220468495, "subjectuid":"abc123", "subjectname":"John Doe", "predicate":"sent you a message",}

(4) Check if Username Exists

In order to perform this operation, ICFS 106 may make a GET request to the "usernameexists" method at:

https://community_provider_system_server/baseurl/v1/usernameexists

The parameters are:

username—A username which the community provider system will check to see if is associated with a UID.

If the user exists, the response may be:

{"stat":"ok","data":{"exists":true, "uid":"uidvalue", "name":"Person's name"}} where, "uidvalue" is the user's UID, and "name" is the user's friendly name.

If the user does not exist, the response is:

{"stat":"ok","data":{"exists":false}}

(5) Check if UID Exists

ICFS 106 client may make a GET request to the "uidexists" method at:

https://community_provider_system_server/baseurl/v1/uidexists

The parameters are:

uid—A uid which community provider system will check to see if is valid.

If the user exists, the response is:

{"stat":"ok","data":{"exists":true, "uid":"uidvalue", "name":"Person's name"}} where, "uidvalue" is the user's UID and "name" is the user's friendly name.

If the user does not exist, the response is:

{"stat":"ok","data":{"exists":false}}

(6) Notify of a Status Message Change

ICFS 106 may notify the community provider system when a user changes their status message in the IM interface. The community provider system may optionally use this information to update the user's status on their site, but doing so is not required. If a community provider system does not wish to support this, it can simply return a stat ok message in response to all requests for this URL. ICFS 106 client may make a POST request to the "statuschange" method at:

https://community_provider_system_server/baseurl/v1/statuschange

The parameters are:

uid—The uid of user whose status message changed.

status—The new status message for the user.

community provider system sessionkey—(optional) A session key provided by the community provider system when user authenticated, included only if the community provider system provided it to ICFS 106 in authentication response.

If the request is properly formatted, the response is:

{"stat":"ok"}

An ok stat response does not guarantee that the community provider system acted on the information, but simply that it received a properly formatted request.

(7) Report when Community Provider System Notifications are Read

ICFS 106 may report to the community provider system when a notification is read. If a community provider system chooses to store notifications, it can use this information to discard the notifications that have been read. Note that acting on this information is completely optional; if a community provider system does not wish to support this, it can simply return a stat ok message in response to all requests for this URL.

ICFS 106 makes a POST request to the "notificationsread" method at:

https://community_provider_system_server/baseurl/v1/notificationsread

The parameters are:
   uid—The uid of user who has read the notifications.
   notificationids—A comma separated list of notifications that the user has just read.
   community provider system sessionkey—(optional) A session key provided by a community provider system when user authenticated, included only if community provider system provided it to ICFS 106 in authentication response.

If the request is properly formatted, the response is:
   {"stat":"ok"}

An ok stat response does not guarantee that the community provider system acted on the information, but simply that it received a properly formatted request.

(8) Notify when a User has Requested to Add Another User as a Friend

Community provider system sites may choose to allow users to IM with other users who are not friends of the users. If so, users may wish to add friends when chatting with them. ICFS 106 may provide a button in the IM window when a user is chatting with a non-friend to allow them to send an add friend request. ICFS 106 will make a call to the community provider system APIs when the user clicks the button. The community provider system can then use the information to generate an add friend request to the other user, or if the other user has already sent an add friend request, the community provider system may choose to treat it as an approval of the add friend request.

This API call is only a request for a friendship. It is up to the community provider system to determine whether users should be treated as friends as a result of the call. If a new friend should be added to a user's friend list as a result of this call, then the community provider system makes a call to the "addfriend" method of the ICFS_API (described above).

Acting on this information is completely optional; if a community provider system does not wish to support this, it can simply return a stat ok message in response to all requests for this URL.

ICFS 106 may make a POST request to the "addfriendrequest" method at:

https://community_provider_system_server/baseurl/v1/addfriendrequest

The parameters are:
   uid—The uid of user who made the add friend request.
   frienduid—The uid of user who they requested to add.
   community provider system sessionkey—(optional) A session key that was provided by the community provider system when user authenticated, included only if community provider system provided it to ICFS 106 in authentication response.

If the request is properly formatted, the response is:
   {"stat":"ok"}

An "OK" stat response does not guarantee that the community provider system acted on the information, but simply that it received a properly formatted request.

(9) Report when a User has been Blocked

ICFS 106 may report to the community provider system when a user has blocked another user from sending them IMs. The community provider system can choose whether to take any action based on this notification (e.g. disable accounts with excessive reports, block the user from seeing the other user's profile, etc.). Acting on this information is completely optional; if a community provider system does not wish to support this, it can simply return a stat ok message in response to all requests for this URL.

ICFS 106 client may report this by making a POST request to the "blocked" method at:

https://community_provider_system_server/baseurl/v1/blocked

The parameters are:
   uid—The uid of user who blocked the other user.
   blockeduid—The uid of user who was blocked.
   community provider system sessionkey—(optional) A session key that was provided by the community provider system when user authenticated, included only if community provider system provided it to ICFS 106 in authentication response.

If the request is properly formatted, the response is:
   {"stat":"ok"}

An "OK" stat response does not guarantee that the community provider system acted on the information, but simply that it received a properly formatted request.

(10) Notify when a User has Reported Abuse

ICFS 106 may report to the community provider system when a user has reported abusive behavior from another user. The community provider system can choose whether to take any action based on this notification. Acting on this information is completely optional; if a community provider system does not wish to support this, it can simply return a stat ok message in response to all requests for this URL.

ICFS 106 may make a POST request to the "abusereported" method at:

https://community_provider_system_server/baseurl/v1/abusereported

The parameters are:
   uid—The uid of user who reported abuse.
   reporteduid—The uid of user who was reported.
   timestamp—A timestamp (in seconds) when reported.
   details—Any details entered by the user when filling out the report form.
   conv—Any IMs (instant messages) from the current conversation that ICFS 106 has available.
   category—(optional) A category of abuse reported by user, selected from a list of categories a community provider system may optionally provide.
   community provider system sessionkey—(optional) A session key provided by a community provider system when user authenticated, included only if community provider system provided it to ICFS 106 in authentication response.

In one embodiment, the cony parameter is a serialized JSON list of objects, where each object represents one IM from the conversation. Each IM object may comprise the following fields:
   msg—The actual message sent (possibly including html markup).
   timestamp—A timestamp (in seconds) when user sent or received this particular IM.
   send—A Boolean that is True if the user is the sender of this IM, False if the user is the recipient.

The following is an example of the format of the cony parameter. It contains a conversation with two lines, the first sent to the user, and the second sent by the user who is reporting the abuse.

[{"msg": "<html xmlns='http:V/jabber.orgV/protocolV/xhtml-im'><body xmlns='http:VVwww.w3.orgV/1999V/ xhtml'hey there<\/body><\/html>", "timestamp": 1233343675, "send": false}, {"msg": "hey", "timestamp": 1233343677, "send": true}]

If the request is properly formatted, the response is:

{"stat":"ok"}

An "OK" stat response does not guarantee that the community provider system acted on the information, but simply that it received a properly formatted request.

Multiple Instant Communication Sessions For a User For Multiple Community Providers A user can be a member of multiple communities maintained by multiple community provider systems. For example, in the embodiment depicted in FIG. 1, a user may be a member of community A maintained by CPS_A 102 and a member of community B maintained by CPS_B 104. The user may have a different friend list for each user. In one embodiment, ICFS 106 may also maintain its own community and the user may be a member of that community also.

ICFS 106 may provision instant communication services for the multiple communities of which the user is a member. The user may be concurrently logged in to websites of multiple community provider systems. Accordingly, a user may be involved in multiple sessions with different community provider systems. These multiple sessions may be on the same computer or on different computers. For each session with a community provider system, the user may also be involved in an instant communication session facilitated by ICFS 106. Accordingly, a user may be involved in multiple instant communication sessions at the same time.

For example, the user may be logged into the websites of CPS_A (for community A) and CPS_B (for community B). Since ICFS 106 provisions the instant communication services for both of these communities, the user may be involved in an instant communication session for CPS_A and an instant communication session for CPS_B, both instant communication sessions being facilitated by ICFS 106. Since ICFS 106 stores session state information for each instant communication session, ICFS 106 may store instant communication session state information for the user's instant communication session with CPS_A and also for the user's instant communication session with CPS_B.

In one embodiment, ICFS 106 may use the state information stored for a user's instant communication session with one community to affect the user's instant communication session for another community. For example, for a particular user logged into a session with CPS_A and CPS_B, ICFS 106 may use the instant communication session state information stored for the user for CPS_B to affect the instant communication services session of the user for CPS_A. Alternatively, ICFS 106 may use the instant communication session state information stored for the user for CPS_A to affect the instant communication services session of the user for CPS_B.

For example, the session state information stored by ICFS 106 for a user's instant communication session for a particular community website includes information identifying the user's friend list. Accordingly, for a user participating in multiple sessions for multiple communities, ICFS 106 has knowledge of the user's friend list for each of the multiple communities. In one embodiment, ICFS 106 may aggregate the friend lists from the multiple sessions and push the aggregated friend list to the user for each of the sessions. For example, for a user logged into CPS_A and CPS_B, ICFS 106 has information about the user's friend list for community A (friend list A) and the user's friend list for community B (friend list B). In one embodiment, ICFS 106 may combine friend list A and friend list B to create an aggregated friend list. The aggregated friend list may then be pushed by ICFS 106 to the user's instant communication session for community A and also for community B. Accordingly, for a web page accessed by the user from the website of CPS_A, the instant communication user interface rendered on the web page may list the aggregated list of friends, including the user's friends from community A and the user's friends from community B. This enables the user to have an IM chat not only with friends from community A but also with friends from community B. Other types of information included in each session state information (e.g., notifications, presence, status, etc.) may also be aggregated and pushed to the user in a like manner.

In one embodiment, ICFS 106 can display friends and provision an instant communication session for a community provider system (e.g., CPS_B) with or without the user being on the site of CPS_B at the current time. ICFS 106 may also provide an instant communication session with traditional IM networks such as AIM, GoogleTalk, etc.

Figure 10:
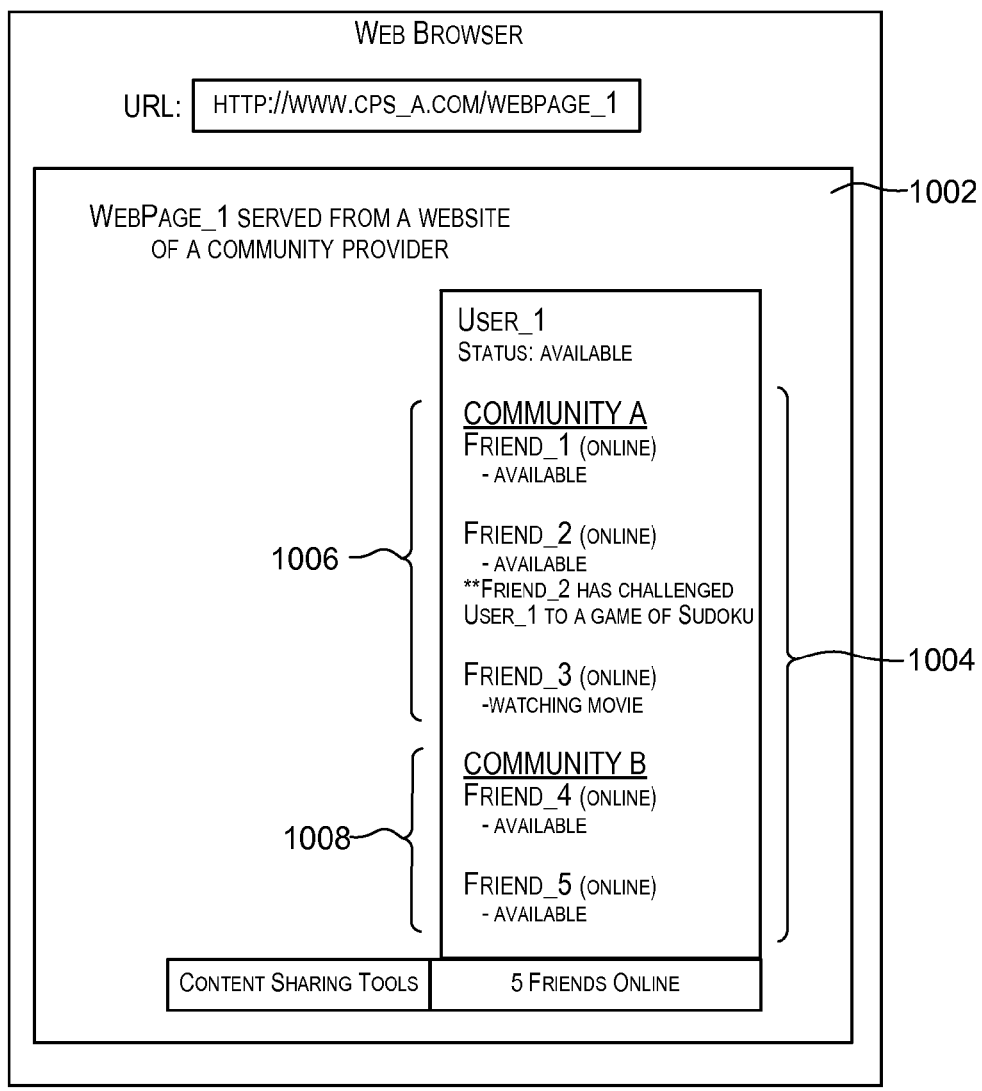
FIG. 10 depicts an example of how session state information for multiple instant communication sessions may be aggregated and displayed in an instant communication user interface according to an embodiment of the present invention.

FIG. 10 depicts an example of how session state information for multiple instant communication sessions may be aggregated and displayed in an instant communication user interface according to an embodiment of the present invention. In the embodiment depicted in FIG. 10, the user (User_1) has logged into and accessed a web page ("WebPage_1") 1002 served from the website of CPS_A. The instant communication user interface displayed on web page 1002 displays a list 1004 of the user's friends. List 1004 comprises two sublists 1006 and 1008. Sublist 1006 displays the user's friends for community A (maintained by CPS_A). Additionally, sublist 1008 displays the user's friends for community B (maintained by CPS_B). This enables the user to exchange IMs with friends from either community from within a web page served from the web site of one of the communities. As depicted in FIG. 10, presence information, status information, and notifications, if any, for the friends are also displayed. In the embodiment depicted in FIG. 10, the notifications are displayed in the same window that displays the friend list. In an alternative embodiment, the notifications received by a user may be displayed in a separate window from the window displaying the user's friends.

Figure 11:
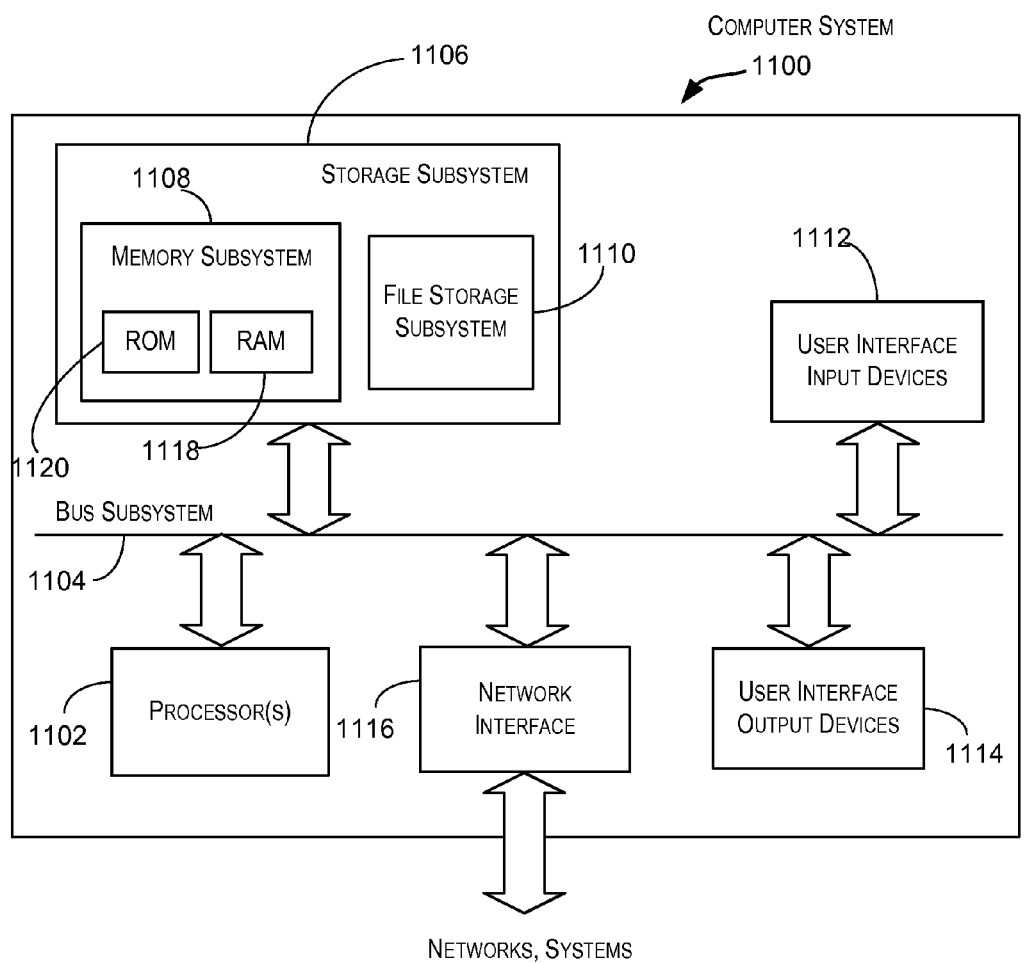
FIG. 11 is a simplified block diagram of a computer system that may be used to practice an embodiment of the present invention.

FIG. 11 is a simplified block diagram of a computer system 1100 that may be used to practice an embodiment of the present invention. In various embodiments, computer system 1100 may be used to implement any of the computers or systems illustrated in FIG. 1 and described above. For example, computer system 1100 may be used as ICFS 106 (or a component thereof) or user system 108. As shown in FIG. 11, computer system 1100 includes a processor 1102 that communicates with a number of peripheral subsystems via a bus subsystem 1104. These peripheral subsystems may include a storage subsystem 1106, comprising a memory subsystem 1108 and a file storage subsystem 1110, user interface input devices 1112, user interface output devices 1114, and a network interface subsystem 1116.

Bus subsystem 1104 provides a mechanism for letting the various components and subsystems of computer system 1100 communicate with each other as intended. Although bus subsystem 1104 is shown schematically as a single bus, alternative embodiments of the bus subsystem may utilize multiple busses.

Network interface subsystem 1116 provides an interface to other computer systems and networks. Network interface subsystem 1116 serves as an interface for receiving data from and transmitting data to other systems from computer system 1100. For example, network interface subsystem 1116 may enable a user computer to connect to the Internet and facilitate communications using the Internet.

User interface input devices 1112 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 1100.

User interface output devices 1114 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 1100.

Storage subsystem 1106 provides a computer-readable storage medium for storing the basic programming and data constructs that provide the functionality of the present invention. Software (programs, code modules, instructions) that when executed by a processor provide the functionality of the present invention may be stored in storage subsystem 1106. These software modules or instructions may be executed by processor(s) 1102. Storage subsystem 1106 may also provide a repository for storing data used in accordance with the present invention. Storage subsystem 1106 may comprise memory subsystem 1108 and file/disk storage subsystem 1110.

Memory subsystem 1108 may include a number of memories including a main random access memory (RAM) 1118 for storage of instructions and data during program execution and a read only memory (ROM) 1120 in which fixed instructions are stored. File storage subsystem 1110 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 1100 can be of various types including a personal computer, a portable computer, a workstation, a network computer, a mainframe, a kiosk, a server or any other data processing system. Due to the ever-changing nature of computers and networks, the description of computer system 1100 depicted in FIG. 11 is intended only as a specific example for purposes of illustrating the preferred embodiment of the computer system. Many other configurations having more or fewer components than the system depicted in FIG. 11 are possible.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A computer-implemented method for provisioning instant communication services comprising:
    facilitating, by a first domain, instant communications for a first online community having a first set of members, the first online community operating from a second domain different from the first domain;
    generating an instant communication session associated with a first web page accessed by a first member of the first online community, the first web page from a website of the first online community;
    causing a first user interface to be displayed as an overlay on the first web page, the overlay covering a portion of the first web page, wherein the first user interface includes a chat window enabling the first member to exchange messages with a second member from the first set of members of the first online community and a list window displaying at least one member from the first set of members, the list window adjacent to the chat window;
    responsive to a second web page being accessed by the first member, retrieving session state information associated with the instant communication session and the messages exchanged between the first member and the second member, the second web page from the website of the first online community;
    preserving, based on the session state information, the instant communication session from the first web page to the second web page by causing the same first user interface, including the chat window and the adjacent list window, to be overlaid on the second web page, the session state information describing a status of the instant communication session and including information describing one or more messages sent by the first member, the second web page accessed by the first member and from the website of the first online community;
    wherein the facilitating enables the first member of the first online community to exchange one or more messages with the second member of the first online community using an instant communication technology;
    facilitating, by the first domain, instant communications for a second online community having a second set of members, the second online community operating from a third domain different from the first and second domains; wherein the first user is a member of the first online community and the second online community, the user having a first list of friends for the first online community and a second list of friends for the second online community; and
    causing an aggregated list of friends to be displayed on the first web page accessed by the user from the website of the first online community, the aggregated list of friends comprising one or more friends in the first list of friends and one or more friends in the second list of friends.

2. The method of claim 1 wherein the instant communication technology uses instant messaging (IM).

3. The method of claim 1 further comprising:
    storing, at a system in the first domain, the session state information for the first member, the session state information comprising information related to the first user interface.

4. The method of claim 1 wherein causing the first user interface to be displayed as the overlay on the first web page comprises:
for at least one member of the first online community:
displaying presence information for the member; and
displaying status information for the member.

5. The method of claim 1 wherein causing the first user interface to be displayed as the overlay on the first web page comprises:
displaying a notification sent to the first member from the second member of the first online community.

6. The method of claim 1 wherein the facilitating comprises:
providing a first set of application programming interfaces (APIs) for the first domain, the first set of APIs being callable from the second domain for exchanging information with the first domain; and
providing a second set of application programming interfaces (APIs) for the second domain, the second set of APIs being callable from the first domain for exchanging information with the second domain.

7. The method of claim 1
wherein the facilitating enables a third member of the second online community to exchange one or more messages with a fourth member of the second online community using the instant communication technology.

8. The method of claim 1, wherein causing the first user interface to be displayed as the overlay on the first web page includes causing the first user interface to be displayed as a bar overlaid on the first web page.

9. The method of claim 8, wherein the first user interface includes a set of content-sharing tools that enables content from the first web page to be shared by the first member with the second member from the set of members of the first online community.

10. A computer-readable storage medium storing a plurality of instructions for controlling a processor to provision instant communication services, the plurality of instructions comprising:
instructions that cause the processor to facilitate, by a first domain, instant communications for a first online community, the first online community operating from a second domain different from the first domain;
instructions that cause the processor to generate an instant communication session associated with a first web page accessed by a first member of the first online community, the first web page from a website of the first online community;
instructions that cause the processor to cause a first user interface to be displayed as an overlay on a first web page, the overlay covering a portion of the first web page, wherein the first user interface includes a chat window enabling the first member to exchange messages with a second member from a set of members of the first online community and a list window displaying at least one member from the set of members, the list window adjacent to the chat window;
instructions that cause the processor, responsive to a second web page being accessed by the first member, to retrieve session state information associated with the instant communication session and the messages exchanged between the first member and the second member, the second web page from the website of the first online community;
instructions that cause the processor to preserve, based on the session state information, the instant communication session from the first web page to the second web page by causing the same first user interface, including the chat window and the adjacent list window, to be overlaid on the second web page, the session state information describing a status of the instant communication session and including information describing one or more messages sent by the first member, the second web page accessed by the first member and from the website of the first online community;
wherein the facilitating enables the first member of the first online community to exchange one or more messages with the second member of the first online community using an instant communication technology;
instructions that cause the processor to facilitate, by the first domain, instant communications for a second online community, the second online community operating from a third domain different from the first and second domains, wherein, for a user who is a member of the first online community and the second online community, the user has a first list of friends for the first online community and a second list of friends for the second online community; and
instructions that cause the processor to cause an aggregated list of friends to be displayed on the first web page accessed by the user from the website of the first online community, the aggregated list of friends comprising one or more friends in the first list of friends and one or more friends in the second list of friends.

11. The computer-readable storage medium of claim 10 wherein the instant communication technology uses instant messaging (IM).

12. The computer-readable storage medium of claim 10 wherein the plurality of instructions further comprises:
instructions that cause the processor to store, at a system in the first domain, the session state information for the first member, the session state information comprising information related to the first user interface.

13. The computer-readable storage medium of claim 10 wherein the instructions that cause the processor to cause the first user interface to be displayed as the overlay on the first web page comprise:
instructions that cause the processor to, for at least one member of the first online community:
display presence information for the member; and
display status information for the member.

14. The computer-readable storage medium of claim 10 wherein the instructions that cause the processor to cause the first user interface to be displayed as the overlay on the first web page comprise:
instructions that cause the processor to display a notification sent to the first member from the second member of the first online community.

15. The computer-readable storage medium of claim 10 wherein the instructions that cause the processor to facilitate instant communications comprises:
instructions that cause the processor to provide a first set of application programming interfaces (APIs) for the first domain, the first set of APIs being callable from the second domain for exchanging information with the first domain; and
instructions that cause the processor to provide a second set of application programming interfaces (APIs) for the second domain, the second set of APIs being callable from the first domain for exchanging information with the second domain.

16. The computer-readable storage medium of claim 10 wherein
the facilitating enables a third member of the second online community to exchange one or more messages with a fourth member of the second online community using the instant communication technology.

17. A system comprising:
a memory; and
a processor coupled with the memory, the processor configured to:
facilitate instant communications for a first online community, thereby enabling a first member of the first online community to exchange one or more messages with a second member of the first online community using an instant communication technology;
generate an instant communication session associated with a first web page accessed by the first member of the first online community, the first web page from a website of the first online community;
cause a first user interface to be displayed as an overlay on the first web page, the overlay covering a portion of the first web page, wherein the first user interface includes a chat window enabling the first member to exchange messages with the second member from a set of members of the first online community and a list window displaying at least one member from the set of members, the list window adjacent to the chat window;
responsive to a second web page being accessed by the first member, retrieve session state information associated with the instant communication session and the messages exchanged between the first member and the second member, the second web page from the website of the first online community;
preserve, based on the session state information, the instant communication session from the first web page to the second web page by causing the same first user interface, including the chat window and the adjacent list window, to be overlaid on the second web page, the session state information describing a status of the instant communication session and including information describing one or more messages sent by the first member, the second web page accessed by the first member and from the website of the first online community;
wherein the system is in a first domain and the first online community is maintained by a second domain different from the first domain;
facilitate instant communications for a second online community, the second online community operating from a third domain different from the first and second domains, wherein for a user who is a member of the first online community and the second online community, the user has a first list of friends for the first online community and a second list of friends for the second online community; and
cause an aggregated list of friends to be displayed on the first web page accessed by the user from the website of the first online community, the aggregated list of friends comprising one or more friends in the first list of friends and one or more friends in the second list of friends.

18. The system of claim 17 wherein:
the memory is configured to store the session state information for the first member, the session state information comprising information related to the first user interface.

19. The system of claim 17 wherein the processor is configured to:
cause presence information for at least one member of the first online community to be displayed in the first user interface;
cause status information for at least one member of the first online community to be displayed in the first user interface.

20. The system of claim 17 wherein the processor is configured to:
cause a notification sent to the first member from the second member of the first online community to be displayed in the first user interface.

21. The system of claim 17 wherein
the facilitating enables a third member of the second online community to exchange one or more messages with a fourth member of the second online community using the instant communication technology.

* * * * *